(12) United States Patent
Chang et al.

(10) Patent No.: US 10,746,961 B2
(45) Date of Patent: *Aug. 18, 2020

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chen-Hung Tsai, Taichung (TW); Hung-Wen Lee, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 162 days.

This patent is subject to a terminal disclaimer.

(21) Appl. No.: 16/017,253

(22) Filed: Jun. 25, 2018

(65) Prior Publication Data

US 2019/0250369 A1 Aug. 15, 2019

(30) Foreign Application Priority Data

Feb. 13, 2018 (TW) .............................. 107105352 A

(51) Int. Cl.
*G02B 13/00* (2006.01)
*G02B 9/34* (2006.01)
*G02B 27/00* (2006.01)
*H04N 5/225* (2006.01)

(52) U.S. Cl.
CPC ............. *G02B 13/004* (2013.01); *G02B 9/34* (2013.01); *G02B 27/0025* (2013.01); *H04N 5/2251* (2013.01)

(58) Field of Classification Search
CPC ........ G02B 13/004; G02B 9/34; G02B 13/18; G02B 13/04; G02B 27/0025
USPC ........................................................... 359/715
See application file for complete search history.

(56) References Cited

U.S. PATENT DOCUMENTS 9,835,828 B2 * 12/2017 Liu ..................... G02B 13/0045
10,048,468 B2 * 8/2018 Lai ..................... G02B 27/0025

FOREIGN PATENT DOCUMENTS

| TW | 201241501 A1 | 10/2012 |
| TW | M544001 U | 6/2017 |
| TW | M456515 U | 8/2017 |

* cited by examiner

*Primary Examiner* — Mohammed A Hasan
(74) *Attorney, Agent, or Firm* — Muncy, Geissler, Olds & Lowe, P.C.

(57) ABSTRACT

An optical image capturing system with four lenses is provided. In order from an object side to an image side, the optical image capturing system includes a first lens, a second lens, a third lens and a fourth lens. The first lens has positive refractive power and the object side thereof may be a convex surface. The second lens and the third lens have refractive power and the object side and the image side thereof may be all aspheric. The fourth lens has negative power and the image side thereof may be a concave surface. The object side and the image side of the fourth lens are aspheric and at least one surface thereof has one inflection point. When meeting some certain conditions, the optical image capturing system may have outstanding light-gathering ability and an adjustment ability about the optical path in order to elevate the image quality.

25 Claims, 18 Drawing Sheets

OPTICAL IMAGE CAPTURING SYSTEM

CROSS-REFERENCE TO RELATED APPLICATION

This application claims the benefit of Taiwan Patent Application No. 107105352, filed on Feb. 13, 2018, in the Taiwan Intellectual Property Office, the invention of which is incorporated herein in its entirety by reference.

BACKGROUND OF THE INVENTION

Field of the Invention

The present invention relates to an optical image capturing system, and more particularly is about a minimized optical image capturing system which can be applied to electronic products.

Description of the Related Art

In recent years, with the rise of portable electronic devices having camera functionalities, the demand for an optical image capturing system has gradually been raised. The image sensing device of the ordinary photographing camera is commonly selected from a charge coupled device (CCD) or a complementary metal-oxide semiconductor sensor (CMOS Sensor). Also, as advanced semiconductor manufacturing technology enables the minimization of the pixel size of the image sensing device, the development of the optical image capturing system has gravitated towards the field of high pixels. Therefore, the requirement for high imaging quality has been rapidly increasing.

Conventional optical image capturing systems of portable electronic devices usually adopt a two lenses structure or three lenses structure as their main structure. However, since the pixel density of portable electronic devices has continuously increased, more end-users are demanding a large aperture for such as functionalities as glimmer and night view, or for a wide angle of view such as for selfies using the front camera. But the optical image capturing system with the large aperture often encounters the dilemma of plentiful aberration which results in the deterioration of peripheral image quality and difficulties about manufacturing, and the optical image capturing system with wide angle of view design encounters the dilemma of increased distortion rate in image formation. Conventional optical image capturing systems may not be sufficient to meet those advanced photography requirements.

Therefore, how to design an optical image capturing system capable of balancing the requirements for higher total pixel count and the quality of the formed image as well as the minimization of camera module by effectively increasing the amount of admitted light and the angle of view the optical image capturing system has become an important issue.

SUMMARY OF THE INVENTION

The aspect of embodiment of the present invention directs to an optical image capturing system which is able to use combination of refractive powers, convex and concave surfaces of four optical lenses (the convex or concave surface in the invention is the geometrical shape of an object side or an image side of each lens on an optical axis in principle) to increase the amount of light admitted into the optical image capturing system and angle of view of the optical image capturing system and to elevate the image quality and the total pixels of image, so that the optical image capturing system can be applied to the minimized electronic products.

The terms and their definition for the lens parameters in the embodiment of the present invention are shown as below for further reference.

The Lens Parameters Related to the Length or Height

The maximum image height of the optical image capturing system may be expressed as HOI. The height of the optical image capturing system may be expressed as HOS. The distance from the object side of the first lens to the image side of the fourth lens of the optical image capturing system may be expressed as InTL. The distance from the image side of the fourth lens to the image plane of the optical image capturing system may be expressed as InB. The following equation is satisfied: InTL+InB=HOS. The distance from a fixed aperture (stop) of the optical image capturing system to the image plane of the optical image capturing system may be expressed as InS. The distance from the first lens to the second lens of the optical image capturing system may be expressed as In12 (example). The thickness of the first lens of the optical image capturing system on the optical axis may be expressed as TP1 (example).

The Lens Parameters Related to the Material

A coefficient of dispersion of the first lens in the optical image capturing system may be expressed as NA1 (example). A refractive index of the first lens may be expressed as Nd1 (example).

The Lens Parameters Related to the Angle of View

The angle of view may be expressed as AF. A half angle of view may be expressed as HAF. An angle of a chief ray may be expressed as MRA.

The Lens Parameters Related to Exit/Entrance Pupil

An entrance pupil diameter of the optical image capturing system may be expressed as HEP. The maximum effective half diameter (EHD) of any surface of a single lens refers to a perpendicular height between the optical axis and an intersection point, where the incident ray at the maximum angle of view passing through the most marginal entrance pupil intersects with the surface of the lens. For example, the maximum effective half diameter of the object side of the first lens may be expressed as EHD11. The maximum effective half diameter of the image side of the first lens may be expressed as EHD 12. The maximum effective half diameter of the object side of the second lens may be expressed as EHD21. The maximum effective half diameter of the image side of the second lens may be expressed as EHD22. The maximum effective half diameters of any surfaces of other lens in the optical image capturing system are expressed in a similar way.

The Lens Parameters Related to the Arc Length of the Lens Shape and the Outline of Surface The length of the maximum effective half diameter outline curve at any surface of a single lens refers to an arc length of a curve, which starts from a starting point which is an intersection point on the surface of the lens crossing the optical axis of the optical image capturing system, travels along the outline of the surface and ends at the ending point which is the maximum effective half diameter position of the surface, and this arc length may be expressed as ARS. For example, the length of the maximum effective half diameter outline curve of the object side of the first lens may be expressed as ARS11. The length of the maximum effective half diameter outline curve of the image side of the first lens may be expressed as ARS12. The length of the maximum effective half diameter outline curve of the object side of the second lens may be expressed as ARS21. The length of the maximum effective half diameter outline curve of the image side of the second lens may be expressed as ARS22. The lengths of the maximum effective half diameter outline curve of any surface of other lens in the optical image capturing system are expressed in a similar way.

The length of ½ entrance pupil diameter (HEP) outline curve of any surface of a single lens refers to an arc length of curve, which starts from a starting point which is an intersection point on the surface of the lens crossing the optical axis of the optical image capturing system, travels along the outline of the surface of the lens and ends at a coordinate point on the surface where the vertical height from the optical axis to the surface is equivalent to ½ entrance pupil diameter; and the arc length may be expressed as ARE. For example, the length of the ½ entrance pupil diameter (HEP) outline curve of the object side of the first lens may be expressed as ARE11. The length of the ½ entrance pupil diameter (HEP) outline curve of the image side of the first lens is expressed as ARE12. The length of the ½ entrance pupil diameter (HEP) outline curve of the object side of the second lens may be expressed as ARE21. The length of the ½ entrance pupil diameter (HEP) outline curve of the image side of the second lens may be expressed as ARE22. The lengths of the ½ entrance pupil diameter (HEP) outline curve of any surfaces of the other lens in the optical image capturing system are expressed in a similar way.

The Lens Parameters Related to the Surface Depth of the Lens

The horizontal distance from an intersection point where the object side of the fourth lens crosses the optical axis to a maximum effective half diameter position of the object side of the fourth lens may be expressed as InRS41 (example). The horizontal distance from an intersection point where the image side of the fourth lens crosses the optical axis to a maximum effective half diameter position of the image side of the fourth lens may be expressed as InRS42 (example).

The Lens Parameters Related to the Lens Shape

The critical point C is a point which is tangential to the tangential plane and perpendicular to the optical axis on the specific surface of the lens except that an intersection point which crosses the optical axis on the specific surface of the lens. In addition to the description above, the perpendicular distance between the critical point C31 on the object side of the third lens and the optical axis may be expressed as HVT31 (example). The perpendicular distance between a critical point C32 on the image side of the third lens and the optical axis may be expressed as HVT32 (example). The perpendicular distance between the critical point C41 on the object side of the fourth lens and the optical axis may be expressed as HVT41 (example). The perpendicular distance between a critical point C42 on the image side of the fourth lens and the optical axis may be expressed as HVT42 (example). The perpendicular distances between the critical point on the image side or the object side of other lens and the optical axis are expressed in a similar way.

The inflection point on the object side of the fourth lens that is nearest to the optical axis may be expressed as IF411, wherein the sinkage value of the inflection point IF411 may be expressed as SGI411 (example). The sinkage value SGI411 is a horizontal distance parallel to the optical axis, which is from an intersection point where the object side of the fourth lens crosses the optical axis to the inflection point on the object side of the fourth lens that is nearest to the optical axis. The perpendicular distance between the inflection point IF411 and the optical axis may be expressed as HIF411 (example). The inflection point on the image side of the fourth lens that is nearest to the optical axis may be expressed as IF421, and the sinkage value of the inflection point IF421 may be expressed as SGI421 (example). The sinkage value SGI421 is a horizontal distance parallel to the optical axis, which is from the intersection point where the image side of the fourth lens crosses the optical axis to the inflection point on the image side of the fourth lens that is nearest to the optical axis. The perpendicular distance between the inflection point IF421 and the optical axis may be expressed as HIF421 (example).

The inflection point on the object side of the fourth lens that is the second nearest to the optical axis may be expressed as IF412 and the sinkage value of the inflection point IF412 may be expressed as SGI412 (example). The SGI412 is a horizontal distance parallel to the optical axis, which is from an intersection point where the object side of the fourth lens crosses the optical axis to the inflection point on the object side of the fourth lens that is the second nearest to the optical axis. The perpendicular distance between the inflection point IF412 and the optical axis may be expressed as HIF412 (example). The inflection point on the image side of the fourth lens that is the second nearest to the optical axis may be expressed as IF422 and the sinkage value of the inflection point IF422 may be expressed as SGI422 (example). The SGI422 is a horizontal distance parallel to the optical axis, which is from an intersection point where the image side of the fourth lens crosses the optical axis to the inflection point on the image side of the fourth lens that is second nearest to the optical axis. The perpendicular distance between the inflection point IF422 and the optical axis may be expressed as HIF422 (example).

The inflection point on the object side of the fourth lens that is the third nearest to the optical axis may be expressed as IF413 and the sinkage value of the inflection point IF413 may be expressed as SGI413 (example). The SGI413 is a horizontal distance parallel to the optical axis, which is from an intersection point where the object side of the fourth lens crosses the optical axis to the inflection point on the object side of the fourth lens that is the third nearest to the optical axis. The perpendicular distance between the inflection point IF413 and the optical axis may be expressed as HIF413 (example). The inflection point on the image side of the fourth lens that is the third nearest to the optical axis may be expressed as IF423 and the sinkage value of the inflection point IF423 may be expressed as SGI423 (example). The SGI423 is a horizontal distance parallel to the optical axis, which is from an intersection point where the image side of the fourth lens crosses the optical axis to the inflection point on the image side of the fourth lens that is the third nearest to the optical axis. The perpendicular distance between the inflection point IF423 and the optical axis may be expressed as HIF423 (example).

The inflection point on the object side of the fourth lens that is the fourth nearest to the optical axis may be expressed as IF414 and the sinkage value of the inflection point IF414 may be expressed as SGI414 (example). The SGI414 is a horizontal distance parallel to the optical axis, which is from an intersection point where the object side of the fourth lens crosses the optical axis to the inflection point on the object side of the fourth lens that is the fourth nearest to the optical axis. The perpendicular distance between the inflection point IF414 and the optical axis may be expressed as HIF414 (example). The inflection point on the image side of the fourth lens that is the fourth nearest to the optical axis may be expressed as IF424 and the sinkage value of the inflection point IF424 may be expressed as SGI424 (example). The SGI424 is a horizontal distance parallel to the optical axis, which is from an intersection point where the image side of the fourth lens crosses the optical axis to the inflection point on the image side of the fourth lens that is the fourth nearest to the optical axis. The perpendicular distance between the inflection point IF424 and the optical axis may be expressed as HIF424 (example).

The inflection points on the object side or the image side of the other lenses and the perpendicular distances between them and the optical axis, or the sinkage values thereof are expressed according to the regular patterns shown above.

The Lens Parameters Related to the Aberration

Optical distortion for image formation in the optical image capturing system may be expressed as ODT. TV distortion for image formation in the optical image capturing system may be expressed as TDT. Additionally, the degree of aberration offset within the range of 50% to 100% field of view of the formed image may be further defined. The offset of the spherical aberration may be expressed as DFS. The offset of the coma aberration may be expressed as DFC.

The transverse aberration of the margin of the aperture may be expressed as STA and evaluates the performance of the specific optical image capturing system. The transverse aberration of any field of view may be calculated by utilizing the tangential fan and the sagittal fan. Specifically, The transverse aberration of the longest operation wavelength (for instance, the wavelength is 650 nm) and the shortest operation wavelength (for instance, the wavelength is 470 nm) respectively passing through the margin of the aperture are calculated to act as the standard of the performance of the optical image capturing system. The aforementioned coordinate direction of the tangential fan can be further divided into the positive direction (the upper ray) and the negative direction (the lower ray). The transverse aberration of the longest operation wavelength passing through the margin of the aperture defines the difference between the image position at the specific field of view where the longest operation wavelength passes through the margin of the aperture and strikes on the image plane and the image position at the specific field of view where the chief ray with the reference wavelength (for instance, the wavelength is 555 nm) strikes on the image plane. The transverse aberration of the shortest operation wavelength passing through the margin of the aperture defines the difference between the image position at the specific field of view where the shortest operation wavelength passes through the margin of the aperture and strikes on the image plane and the image position at the specific field of view where the chief ray with the reference wavelength (for instance, the wavelength is 555 nm) strikes on the image plane. To evaluate the performance of the specific optical image capturing system, we can utilize that The transverse aberration of the 0.7 field of view (i.e., the 0.7 height of an image HOI) where the longest operation wavelength passes through the margin of the aperture and strikes on the image plane and The transverse aberration of the 0.7 field of view (i.e., the 0.7 height of an image HOI) where the shortest operation wavelength passes through the margin of the aperture and strikes on the image plane (i.e., the 0.7 height of an image HOI) are both less than 100 μm as a way of the examination. Even further, the method of the examination can be that the transverse aberration of the 0.7 field of view where the longest operation wavelength passes through the margin of the aperture and strikes on the image plane and The transverse aberration of the 0.7 field of view where the shortest operation wavelength passes through the margin of the aperture and strikes on the image plane are both less than 80 μm.

There is a maximum image height HOI of the optical image capturing system on the image plane which is vertical to the optical axis. The lateral aberration of the longest operation wavelength of visible light of a positive tangential fan of the optical image capturing system passing through the margin of the entrance pupil and incident on the image plane by 0.7 HOI may be expressed as PLTA, and The lateral aberration of the shortest operation wavelength of visible light of the positive tangential fan of the optical image capturing system passing through the margin of the entrance pupil and incident on the image plane by 0.7 HOI may be expressed as PSTA. The lateral aberration of the longest operation wavelength of visible light of a negative tangential fan of the optical image capturing system passing through the margin of the entrance pupil and incident on the image plane by 0.7 HOI may be expressed as NLTA, and The lateral aberration of the shortest operation wavelength of visible light of a negative tangential fan of the optical image capturing system passing through the margin of the entrance pupil and incident on the image plane by 0.7 HOI may be expressed as NSTA. The lateral aberration of the longest operation wavelength of visible light of a sagittal fan of the optical image capturing system passing through the margin of the entrance pupil and incident on the image plane by 0.7 HOI may be expressed as SLTA, and The lateral aberration of the shortest operation wavelength of visible light of the sagittal fan of the optical image capturing system passing through the margin of the entrance pupil and incident on the image plane by 0.7 HOI may be expressed as SSTA.

The present invention provides the optical image capturing system. The object side or the image side of the fourth lens may be provided with the inflection points which can adjust incident angle on the fourth lens at each angle of view and conduct amendments for the optical distortion and TV distortion. Besides, the surface of the fourth lens may be provided with the function of the preferable adjustment about the optical path so as to elevate the image quality.

An optical image capturing system is provided in accordance with the present invention. In the sequence from an object side to an image side, a first lens, a second lens, a third lens, a fourth lens and an image plane are included. The first lens has the refractive power. The focal lengths of the first lens to fourth lens may be expressed as f1, f2, f3 and f4, respectively. The focal length of the optical image capturing system may be expressed as f. The entrance pupil diameter of the optical image capturing system may be expressed as HEP. The distance on the optical axis from an object side of the first lens to the image plane may be expressed as HOS. A half maximum angle of view of the optical image capturing system may be expressed as HAF. With a point on the surface of any one of the four lenses which crosses the optical axis defined as a starting point, a length of an outline curve from the starting point to a coordinate point of vertical height with The distance from the optical axis to the half entrance pupil diameter on the surface along an outline of the surface may be expressed as ARE. Conditions as follows are satisfied: $1 \leq f/HEP \leq 10$, $0\,\deg < HAF \leq 150\,\deg$, and $0.9 \leq 2(ARE/HEP) \leq 2$.

Another optical image capturing system is further provided in accordance with the present invention. In the sequence from an object side to an image side, a first lens, a second lens, a third lens, a fourth lens and an image plane are included. The first lens has refractive power. The second lens has refractive power. The third lens has refractive power. The fourth lens has refractive power. The focal lengths of the first lens to fourth lens may be expressed as f1, f2, f3 and f4, respectively. The focal length of the optical image capturing system may be expressed as f. The entrance pupil diameter of the optical image capturing system may be expressed as HEP. The distance on the optical axis from an object side of the first lens to the image plane may be expressed as HOS. A half maximum angle of view of the optical image capturing system may be expressed as HAF. With a point on the surface of any one of the four lenses which crosses the optical axis defined as a starting point, a length of an outline curve from the starting point to a coordinate point of vertical height with The distance from the optical axis to the half entrance pupil diameter on the surface along an outline of the surface may be expressed as ARE. Conditions as follows are satisfied: $1 \leq f/HEP \leq 10$, $0$ deg $< HAF \leq 150$ deg, and $0.9 \leq 2(ARE/HEP) \leq 2$.

In addition, another optical image capturing system is further provided in accordance with the present invention. In the sequence from an object side to an image side, a first lens, a second lens, a third lens, a fourth lens and an image plane are included. At least one surface on the object side and the image side of the fourth lens has at least one inflection point, and the number of lenses of the optical image capturing system is four. The first lens has refractive power. The second lens has refractive power. The third lens has refractive power. The fourth lens has refractive power. The focal lengths of the first lens to fourth lens may be expressed as f1, f2, f3 and f4, respectively. The focal length of the optical image capturing system may be expressed as f. The entrance pupil diameter of the optical image capturing system may be expressed as HEP. The distance on the optical axis from an object side of the first lens to the image plane may be expressed as HOS. A half maximum angle of view of the optical image capturing system may be expressed as HAF. With a point on the surface of any one of the four lenses which crosses the optical axis defined as a starting point, a length of an outline curve from the starting point to a coordinate point of vertical height with The distance from the optical axis to the half entrance pupil diameter on the surface along an outline of the surface may be expressed as ARE. Conditions as follows are satisfied: $1 \leq f/HEP \leq 10$, $0$ deg $< HAF \leq 150$ deg, and $0.9 \leq 2(ARE/HEP) \leq 2$.

The length of outline curve of any surface of a single lens in the range of the maximum effective half diameter influences the ability of the surface aberration correction and the optical path difference at each field of view. The length of outline curve is longer than the ability of the surface aberration correction can be elevated, but this increases difficulty in the production. Therefore, the length of the outline curve of any surface of a single lens must be controlled in the range of the maximum effective half diameter. Specifically, the ratio (ARS/TP) of the length of outline curve of the surface in the range of the maximum effective half diameter (ARS) to the thickness of the lens to which surface belongs on the optical axis (TP) must be controlled. For example, the length of the outline curve of the maximum effective half diameter position of the object side of the first lens may be expressed as ARS11, and the thickness of the first lens on the optical axis may be expressed as TP1, and the ratio between ARS11 and TP1 may be expressed as ARS11/TP1. The length of the outline curve of the maximum effective half diameter position of the image side of the first lens may be expressed as ARS12, and the ratio between ARS12 and TP1 may be expressed as ARS12/TP1. The length of the outline curve of the maximum effective half diameter position of the object side of the second lens may be expressed as ARS21, and the thickness of the second lens on the optical axis may be expressed as TP2, and the ratio between ARS21 and TP2 may be expressed as ARS21/TP2. The length of the outline curve of the maximum effective half diameter position of the image side of the second lens may be expressed as ARS22, and the ratio between ARS22 and TP2 may be expressed as ARS22/TP2. The ratio of the lengths of the outline curve of the maximum effective half diameter positions of any of the surfaces of the other lenses to the thicknesses of the lens to which surface belongs on the optical axis (TP) in the optical image capturing system are expressed in a similar way.

The length of outline curve of any surface of a single lens in the range of the height which is half entrance pupil diameter (HEP) especially influences the ability of the surface aberration correction at the common area of each field of view of ray and the optical path difference at each field of view. The length of outline curve is longer than the ability of the surface aberration correction can be elevated, but this increases difficulty in the production. Therefore, the length of outline curve from any of the surfaces of a single lens must be controlled in the range of the height which is the half entrance pupil diameter (HEP). Specifically, the ratio (ARE/TP) of the length of outline curve of the surface (ARE) in the range of the height which is the half entrance pupil diameter (HEP) to the thickness of the lens to which surface belongs on the optical axis (TP) must be controlled. For example, the length of the outline curve of the height which is the half entrance pupil diameter (HEP) of the object side of the first lens may be expressed as ARE11, and the thickness of the first lens on the optical axis may be expressed as TP1, and the ratio between ARE11 and TP1 may be expressed as ARE11/TP1. The length of the outline curve of the height which is the half entrance pupil diameter (HEP) of the image side of the first lens may be expressed as ARE12, and the ratio between ARE12 and TP1 may be expressed as ARE12/TP1. The length of the outline curve of the height which is the half entrance pupil diameter (HEP) of the object side of the second lens may be expressed as ARE21, and the thickness of the second lens on the optical axis may be expressed as TP2, and the ratio between ARE21 and TP2 may be expressed as ARE21/TP2. The length of the outline curve of the height which is the half entrance pupil diameter (HEP) of the image side of the second lens may be expressed as ARE22, and the thickness of the second lens on the optical axis may be expressed as TP2, and the ratio between ARE22 and TP2 may be expressed as ARE22/TP2. The ratio of the length of the outline curve of the height which is the half entrance pupil diameter (HEP) of the surface of the other lens to the thickness of the lens to which surface belongs on the optical axis in the optical image capturing system are expressed in a similar way.

The optical image capturing system described above may be used to collocate with the image sensing device whose diagonal length is shorter than 1/1.2 inch to form image. Preferably, the size of the image sensing device is 1/2.3 inch. The pixel size of the image sensing device is smaller than 1.4 micrometer (μm). Preferably, the pixel size of the image sensing device is smaller than 1.12 micrometer (μm). The best pixel size of the image sensing device is smaller than 0.9 micrometer (μm). Furthermore, the optical image capturing system is applicable to the image sensing device with an aspect ratio of 16:9.

The foregoing optical image capturing system is applicable to the demands of video recording with more than millions or ten-millions of pixels (e.g. 4K and 2K videos or the so-called UHD and QHD) and simultaneously possessing good image quality.

The height of optical system (HOS) may be appropriately reduced so as to achieve the minimization of the optical image capturing system, when |f1|>f4.

When the relationship |f2|+|f3|>|f1|+|f4| is satisfied, at least one of the second to third lenses may have the weak positive refractive power or weak negative refractive power. The aforementioned weak refractive power indicates that an absolute value of the focal length of a specific lens is greater than 10. When at least one of the second to third lenses has the weak positive refractive power, the positive refractive power of the first lens may be shared, thereby preventing the unnecessary aberration from appearing too early. On the contrary, when at least one of the second to third lenses has the weak negative refractive power, the aberration of the optical image capturing system may be corrected and fine-tuned.

The fourth lens may have the negative refractive power, and the image side thereof may be a concave surface. Hereby, this configuration is beneficial to shorten the back focal length of the fourth lens in order to keep the miniaturization of the optical image capturing system. Besides, at least one surface of the fourth lens may possess at least one inflection point, which is capable of effective reducing incident angles of off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Figure 1A:
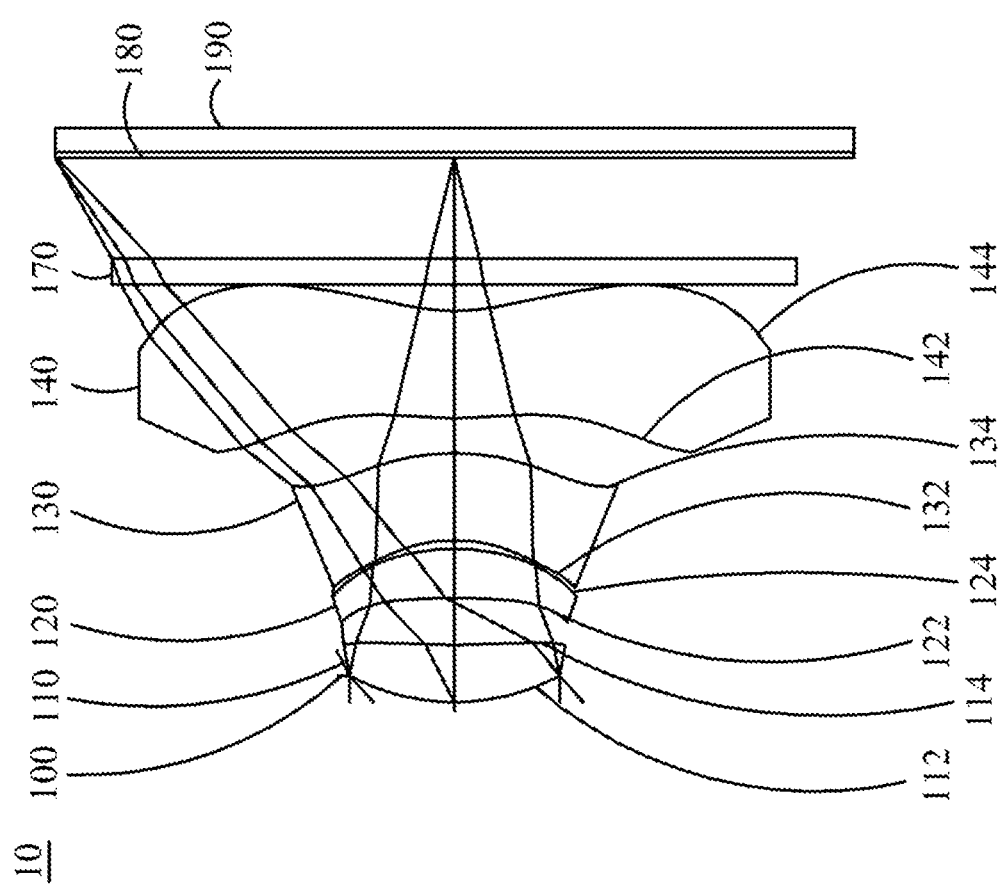
FIG. 1A is a schematic view of the optical image capturing system according to the first embodiment of the present invention.

Reference will now be made to describe in detail the exemplary embodiments of the present invention, examples of which are illustrated in the accompanying drawings. Therefore, it would be appreciated that the foregoing is illustrative of exemplary embodiments and is not to be construed as limited to the disclosed specific embodiments, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

An optical image capturing system, in the sequence from an object side to an image side, includes a first lens, a second lens, a third lens and a fourth lens. The optical image capturing system may further include an image sensing device, which is configured on an image plane.

The optical image capturing system may utilize three sets of wavelengths which are 486.1 nm, 587.5 nm and 656.2 nm respectively, wherein the 587.5 nm wavelength is served as the primary reference wavelength and the reference wavelength for obtaining technical features. The optical image capturing system may also utilize five sets of wavelengths which are 470 nm, 510 nm, 555 nm, 610 nm and 650 nm respectively, wherein the 555 nm wavelength is served as the primary reference wavelength and the reference wavelength for obtaining technical features.

A ratio of the focal length f of the optical image capturing system to the focal length fp of each lens with positive refractive power may be expressed as PPR. A ratio of the focal length f of the optical image capturing system to the focal length fn of each lens with negative refractive power may be expressed as NPR. A sum of the PPR of all lenses with positive refractive powers may be expressed as $\Sigma$PPR, and a sum of the NPR of all lenses with negative refractive powers may be expressed as $\Sigma$NPR. When the following conditions are satisfied: $0.5 \leq \Sigma PPR/|\Sigma NPR| \leq 4.5$, this configuration is beneficial to control the total refractive power and the total length of the optical image capturing system. Preferably, the following condition may be satisfied: $1 \leq \Sigma PPR/|\Sigma NPR| \leq 3.5$.

The height of the optical image capturing system may be expressed as HOS. When the ratio of HOS/f approaches 1, this configuration would be beneficial for manufacturing the miniaturized optical image capturing system which is capable of forming an ultra-high pixel image.

The sum of the focal length fp of each lens with positive refractive power of the optical image capturing system may be expressed as $\Sigma$PP. A sum of the focal length fn of each lens with negative refractive power of the optical image capturing system may be expressed as $\Sigma$NP. In one embodiment of the optical image capturing system of the present invention, the following conditions are satisfied: $0 < \Sigma PP \leq 200$ and $f1/\Sigma PP \leq 0.85$. Preferably, the following conditions may be satisfied: $0 < \Sigma PP \leq 150$ and $0.01 \leq f1/\Sigma PP \leq 0.7$. Hereby, this configuration is beneficial for controlling the focus ability of the optical image capturing system and the positive refractive power of the optical image capturing system is distributed appropriately, so as to suppress the premature formation of noticeable aberration.

The first lens may have positive refractive power and the object side of the first lens may be a convex surface. Hereby, the magnitude of the positive refractive power of the first lens is adjusted properly and is helpful to shorten the total length of the optical image capturing system.

The second lens may have negative refractive power. Hereby, this configuration may amend the aberration generated by the first lens.

The third lens may have positive refractive power. Hereby, this configuration may share the positive refractive power of the first lens.

The fourth lens may have negative refractive power and the image side of the fourth lens may be a concave surface. Besides, at least one surface of the fourth lens may have at least one inflection point. This configuration may suppress incident angles of off-axis rays and further may amend the aberration of off-axis rays. Preferably, the object side and the image side of the fourth lens possess at least one inflection point.

The optical image capturing system may further include an image sensing device, which is configured on the image plane. The half diagonal of an effective sensing field of the image sensing device (i.e. the image height or the so-called maximum image height of the optical image capturing system) may be expressed as HOI. The distance on the optical axis from the object side of the first lens to the image plane may be expressed as HOS, and the following conditions are satisfied: $HOS/HOI \leq 3$ and $0.5 \leq HOS/f \leq 3.0$. Preferably, the following conditions may be satisfied: $1 \leq HOS/HOI \leq 2.5$ and $1 \leq HOS/f \leq 2$. As a result, the optical image capturing system may remain minimized so as to be collocated with a lightweight and portable electronic product.

In addition, in the optical image capturing system of the invention, according to a variety of requirements, at least one aperture may be configured so as to reduce the stray light and to improve image quality.

In the optical image capturing system of the invention, the aperture may be a front or middle aperture. Wherein, the front aperture is the aperture disposed between a photographed object and the first lens while the middle aperture is the aperture disposed between the first lens and the image plane. In the case that the aperture is the front aperture, this configuration can make the optical image capturing system generate a longer distance between the exit pupil and the image plane, such that the optical image capturing system can accommodate more optical elements and the efficiency of the image sensing device in receiving image can be increased; In the case that the aperture is the middle aperture, this configuration can expand the angle of view of the optical image capturing system, such that the optical image capturing system has the advantage of the camera lens with wide angle. The distance from the foregoing aperture to the image plane may be expressed as InS. The following condition is satisfied: $0.5 \leq InS/HOS \leq 1.1$. Preferably, the following condition may be satisfied: $0.8 \leq InS/HOS \leq 1$. Therefore, the optical image capturing system can be kept miniaturized and have a feature of wide angle of view.

In the optical image capturing system of the present invention, the distance from the object side of the first lens to the image side of the fourth lens may be expressed as InTL. The sum of thicknesses of all lenses with refractive power on the optical axis may be expressed as $\Sigma$TP. The following condition is satisfied: $0.45 \leq \Sigma TP/InTL \leq 0.95$. Preferably, the following condition may be satisfied: $0.6 \leq \Sigma TP/InTL \leq 0.9$. Hence, the contrast ratio of the image in the optical image capturing system and the yield rate about manufacturing the lenses may be achieved at the same time, and an appropriate back focal length may be provided so as to accommodate other optical elements in the optical image capturing system.

The curvature radius of the object side of the first lens may be expressed as R1. The curvature radius of the image side of the first lens may be expressed as R2. The following condition is satisfied: $0.01 \leq |R1/R2| \leq 0.5$. Preferably, the following condition may be satisfied: $0.01 \leq |R1/R2| \leq 0.4$.

The curvature radius of the object side of the fourth lens may be expressed as R9. The curvature radius of the image side of the fourth lens may be expressed as R10. The following condition is satisfied: $-200 < (R7-R8)/(R7+R8) < 30$. Hence, the configuration is beneficial for correcting the astigmatism generated by the optical image capturing system.

The distance on the optical axis between the first lens and the second lens may be expressed as IN12. The following condition is satisfied: $0 < IN12/f \leq 0.25$. Preferably, the following condition may be satisfied: $0.01 \leq IN12/f \leq 0.2$. Hence, the configuration is beneficial for improving the chromatic aberration of the lens so as to elevate the performance thereof.

The distance on the optical axis between the second lens and the third lens may be expressed as IN23. The following condition is satisfied: $0<\text{IN23}/f\le0.25$. Preferably, the following condition may be satisfied: $0.01\le\text{IN23}/f\le0.2$. Hence, the configuration is beneficial to improve the performance of the lens.

The distance on the optical axis between the third lens and the fourth lens may be expressed as IN34. The following condition is satisfied: $0<\text{IN34}/f\le0.25$. Preferably, the following condition may be satisfied: $0.001\le\text{IN34}/f\le0.2$. Hence, the configuration is beneficial to improve the performance of the lens.

The thicknesses of the first lens and the second lens on the optical axis may be expressed as TP1 and TP2, respectively, which meets the following condition: $1\le(\text{TP1}+\text{IN12})/\text{TP2}\le10$. Hence, the configuration is helpful to control the sensitivity produced by the optical image capturing system, and improve the performance of the optical image capturing system.

The thicknesses of the third lens and the fourth lens on the optical axis may be expressed as TP3 and TP4, respectively, and the distance on the optical axis between the aforementioned two lenses may be expressed as IN34. The following condition is satisfied: $0.2\le(\text{TP4}+\text{IN34})/\text{TP4}\le20$. Hence, the configuration is helpful to control the sensitivity produced by the optical image capturing system, and reduce the total height of the optical image capturing system.

The distance on the optical axis between the second lens and the third lens may be expressed as IN23. The sum of distances from the first lens to the fourth lens on the optical axis may be expressed as ΣTP. The following condition is satisfied: $0.01\le\text{IN23}/(\text{TP2}+\text{IN23}+\text{TP3})\le0.5$. Preferably, the following condition may be satisfied: $0.05\le\text{IN23}/(\text{TP2}+\text{IN23}+\text{TP3})\le0.4$. Therefore, this configuration is helpful to slightly correct the aberration of the propagating process of the incident light layer by layer, and decrease the total height of the optical image capturing system.

In the optical image capturing system of the present invention, a horizontal distance parallel to the optical axis from a position of maximum effective half diameter on the object side 142 of the fourth lens to an intersection point where the object side 142 of the fourth lens crosses the optical axis of may be expressed as InRS41 (if the horizontal distance is toward the image side of the fourth lens, InRS41 is a positive value; if the horizontal distance is toward the object side of the fourth lens, InRS41 is a negative value). A horizontal distance parallel to the optical axis from a position of maximum effective half diameter on the image side 144 of the fourth lens to an intersection point where the image side 144 of the fourth lens crosses the optical axis may be expressed as InRS42. A thickness of the fourth lens 140 on the optical axis may be expressed as TP4. The following conditions are satisfied. $-1\text{ mm}\le\text{InRS41}\le1\text{ mm}$, $-1\text{ mm}\le\text{InRS42}\le1\text{ mm}$, $1\text{ mm}\le|\text{InRS41}|+|\text{InRS42}|\le2\text{ mm}$, $0.01\le|\text{InRS41}|/\text{TP4}\le10$ and $0.01\le|\text{InRS42}|/\text{TP4}\le10$. Hence, the configuration may control the position of maximum effective half diameter between both surfaces of the fourth lens, and facilitate the aberration correction of the peripheral field of view of the optical image capturing system and effectively maintain the miniaturization of the optical image capturing system.

In the optical image capturing system of the present invention, a horizontal distance parallel to the optical axis from an inflection point on the object side of the fourth lens that is nearest to the optical axis to an intersection point where the object side of the fourth lens crosses the optical axis may be expressed as SGI411. A horizontal distance parallel to the optical axis from an inflection point on the image side of the fourth lens that is nearest to the optical axis to an intersection point where the image side of the fourth lens crosses the optical axis may be expressed as SGI421. The following conditions are satisfied: $0<\text{SGI411}/(\text{SGI411}+\text{TP4})\le0.9$ and $0<\text{SGI421}/(\text{SGI421}+\text{TP4})\le0.9$. Preferably, the following conditions may be satisfied: $0.01<\text{SGI411}/(\text{SGI411}+\text{TP4})\le0.7$ and $0.01<\text{SGI421}/(\text{SGI421}+\text{TP4})\le0.7$.

A horizontal distance parallel to the optical axis from the inflection point on the object side of the fourth lens that is the second nearest to the optical axis to an intersection point where the object side of the fourth lens crosses the optical axis may be expressed as SGI412. A horizontal distance parallel to the optical axis from the inflection point on the image side of the fourth lens that is the second nearest to the optical axis to an intersection point where the image side of the fourth lens crosses the optical axis may be expressed as SGI422. The following conditions are satisfied: $0<\text{SGI412}/(\text{SGI412}+\text{TP4})\le0.9$ and $0<\text{SGI422}/(\text{SGI422}+\text{TP4})\le0.9$. Preferably, the following conditions may be satisfied: $0.1\le\text{SGI412}/(\text{SGI412}+\text{TP4})\le0.8$ and $0.1\le\text{SGI422}/(\text{SGI422}+\text{TP4})\le0.8$.

The perpendicular distance between the inflection point on the object side of the fourth lens that is nearest to the optical axis and the optical axis may be expressed as HIF411. The perpendicular distance between the inflection point on the image side of the fourth lens that is nearest to the optical axis and an intersection point where the image side of the fourth lens crosses the optical axis may be expressed as HIF421. The following conditions are satisfied: $0.01\le\text{HIF411}/\text{HOI}\le0.9$ and $0.01\le\text{HIF421}/\text{HOI}\le0.9$. Preferably, the following conditions may be satisfied: $0.09\le\text{HIF411}/\text{HOI}\le0.5$ and $0.09\le\text{HIF421}/\text{HOI}\le0.5$.

The perpendicular distance between the inflection point on the object side of the fourth lens that is the second nearest to the optical axis and the optical axis may be expressed as HIF412. The perpendicular distance between an intersection point where the image side of the fourth lens crosses the optical axis and the inflection point on the image side of the fourth lens that is the second nearest to the optical axis may be expressed as HIF422. The following conditions are satisfied: $0.01\le\text{HIF412}/\text{HOI}\le0.9$ and $0.01\le\text{HIF422}/\text{HOI}\le0.9$. Preferably, the following conditions may be satisfied: $0.09\le\text{HIF412}/\text{HOI}\le0.8$ and $0.09\le\text{HIF422}/\text{HOI}\le0.8$.

The perpendicular distance between the inflection point on the object side of the fourth lens that is the third nearest to the optical axis and the optical axis may be expressed as HIF413. The perpendicular distance between an intersection point where the image side of the fourth lens crosses the optical axis and the inflection point on the image side of the fourth lens that is the third nearest to the optical axis may be expressed as HIF423. The following conditions are satisfied: $0.001\text{ mm}\le|\text{HIF413}|\le5\text{ mm}$ and $0.001\text{ mm}\le|\text{HIF423}|\le5\text{ mm}$; preferably, the following conditions may be satisfied: $0.1\text{ mm}\le|\text{HIF423}|\le3.5\text{ mm}$ and $0.1\text{ mm}\le|\text{HIF413}|\le3.5\text{ mm}$.

The perpendicular distance between the inflection point on the object side of the fourth lens that is the fourth nearest to the optical axis and the optical axis may be expressed as HIF414. The perpendicular distance between an intersection point where the image side of the fourth lens crosses the optical axis and the inflection point on the image side of the fourth lens that is the fourth nearest to the optical axis may be expressed as HIF424. The following conditions are satisfied: $0.001\text{ mm}\le|\text{HIF414}|\le5\text{ mm}$ and $0.001$ mm≤|HIF424|≤5 mm; preferably, the following conditions may be satisfied: 0.1 mm≤|HIF424|≤3.5 mm and 0.1 mm≤|HIF414|≤3.5 mm.

In one embodiment of the optical image capturing system of the present invention, arranging the lens with high coefficient of dispersion and low coefficient of dispersion in a staggered manner can be helpful to correct the chromatic aberration of the optical image capturing system.

The equation of the aforementioned aspheric surface is:

$$z=ch^2/[1+[1-(k+1)c^2h^2]^{0.5}]+A4h^4+A6h^6+A8h^8+A10h^{16}+A12h^{12}+A14h^{14}+A16h^{16}+A18h^{18}+A20h^{20}+ \quad (1),$$

wherein z is a position value of the position at the height h along the optical axis which refers to the surface apex, k is the conic coefficient, c is the reciprocal of curvature radius, and A4, A6, A8, A10, A12, A14, A16, A18 as well as A20 are high-order aspheric coefficients.

In the optical image capturing system provided by the present invention, the lens may be made of glass or plastic. If the lens is made of plastic, it can reduce the manufacturing cost as well as the weight of the lens effectively. If lens is made of glass, it can control the heat effect and increase the design space of the configuration of the lens with refractive powers in the optical image capturing system. Besides, the object side and the image side of the first lens through fourth lens may be aspheric, which can gain more control variables and even reduce the number of the used lenses in contrast to traditional glass lens in addition to the use of reducing the aberration. Thus, the total height of the optical image capturing system can be reduced effectively.

In addition, in the optical image capturing system provided by the present invention, if the surface of lens is a convex surface, it means that the surface of lens adjacent to the optical axis is a convex surface. If the surface of lens is a concave surface, it means that the surface of lens adjacent to the optical axis is a concave surface.

The optical image capturing system of the present invention can be applied to the optical image capturing system with automatic focus based on the demand and have the characters of the good aberration correction and the high image quality. Thereby, the optical image capturing system expands the application aspect.

The optical image capturing system of the present invention may further include a driving module according to requirements, wherein the driving module may be coupled to the lenses and enables movements of the lenses. The aforementioned driving module may be a voice coil motor (VCM) which is used to move the lenses to focus, or may be the optical image stabilization (OIS) which is applied to reduce the frequency which lead to the out focus due to the vibration of the camera lens in the shooting process.

At least one lens among the first, second, third and fourth lenses of the optical image capturing system of the present invention may further be a light filtering element which has a wavelength less than 500 nm according to requirements. The light filtering element may be made by coating film on at least one surface of that lens with certain filtering function, or forming that lens with a material that can filter light with a short wavelength.

The image plane of the optical image capturing system of the present invention may be a plane or a curved surface based on the design requirements. When the image plane is a curved surface (e.g. a spherical surface with curvature radius), it is helpful to decrease the required incident angle to focus rays on the image plane. In addition to the aid of the miniaturization of the length of the optical image capturing system (TTL), this configuration is helpful to elevate the relative illumination at the same time.

According to the foregoing implementation method, the specific embodiments in coordination with figures are presented in detail as below.

The First Embodiment

Figure 1B:
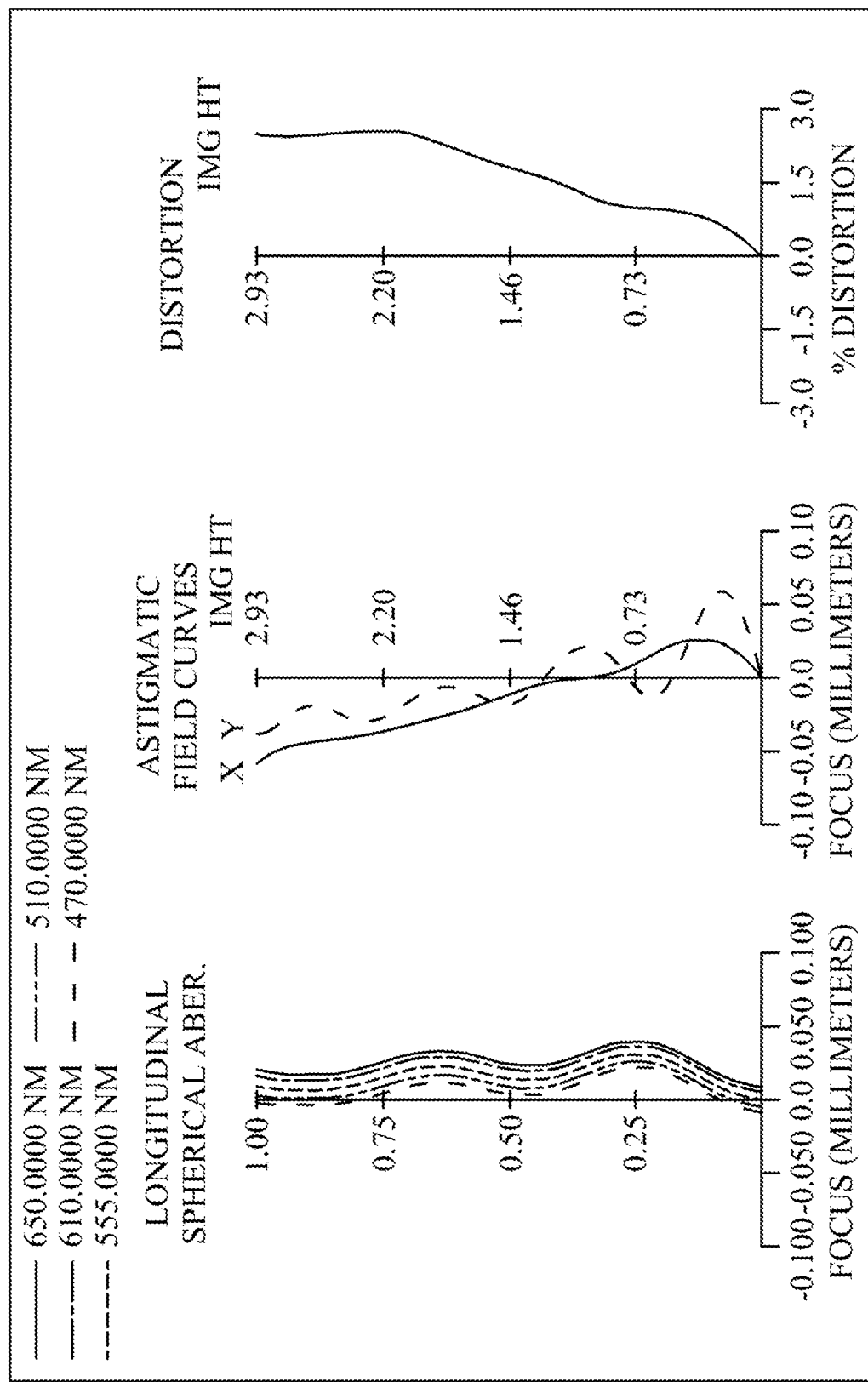
FIG. 1B is a curve diagram illustrating the spherical aberration, astigmatism and optical distortion of the optical image capturing system in the sequence from left to right according to the first embodiment of the present invention.
Figure 1C:
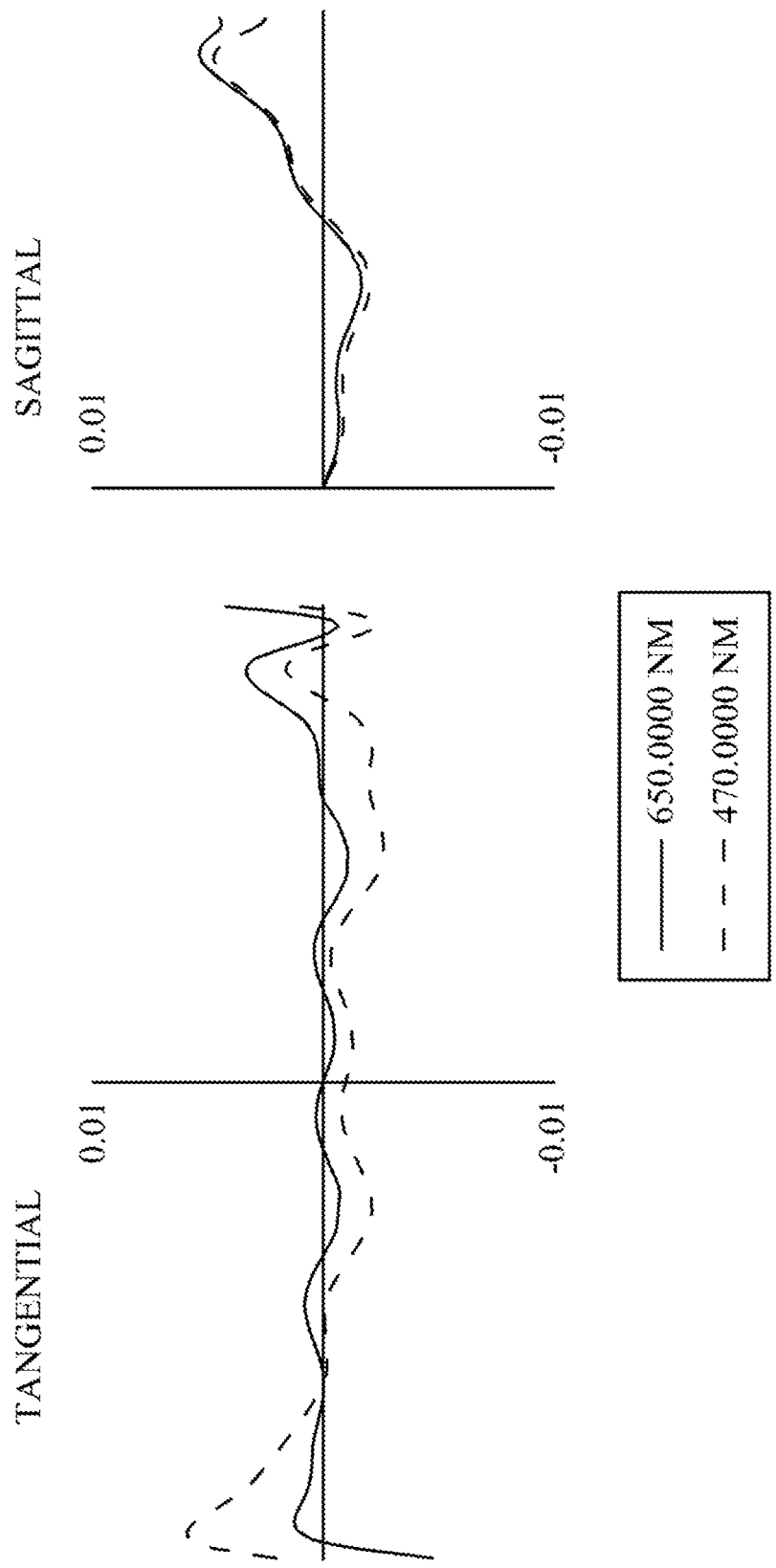
FIG. 1C shows the sagittal fan and the tangential fan of the optical image capturing system and the lateral aberration diagram of the longest operation wavelength and the shortest operation wavelength passing thorough the margin of the aperture at 0.7 field of view according to the first embodiment of the present invention.

Please refer to FIGS. 1A and 1B, wherein FIG. 1A is a schematic view of the optical image capturing system according to the first embodiment of the present invention. FIG. 1B is a curve diagram illustrating the spherical aberration, astigmatism and optical distortion of the optical image capturing system in the sequence from left to right according to the first embodiment of the present invention. FIG. 1C shows the sagittal fan and the tangential fan of the optical image capturing system and the lateral aberration diagram of the longest operation wavelength and the shortest operation wavelength passing thorough the margin of the aperture at 0.7 field of view according to the first embodiment of the present invention.

As shown in FIG. 1A, it may be known that, in the order from an object side to an image side, the optical image capturing system 10 includes an aperture 100, a first lens 110, a second lens 120, a third lens 130, a fourth lens 140, an infrared filter 170, an image plane 180 and an image sensing device 190.

The first lens 110 has the positive refractive power and is made of plastic. The object side 112 of first lens 110 is a convex surface and the image side 114 of the first lens 110 is a concave surface, and the object side 112 and the image side 114 of the first lens 110 are aspheric. The length of the maximum effective half diameter outline curve of the object side 112 of the first lens 110 may be expressed as ARS11. The length of the maximum effective half diameter outline curve of the image side 114 of the first lens 110 may be expressed as ARS12. The length of the ½ entrance pupil diameter (HEP) outline curve of the object side 112 of the first lens 110 may be expressed as ARE11. The length of the ½ entrance pupil diameter (HEP) outline curve of the image side 114 of the first lens 110 may be expressed as ARE12. The thickness of the first lens 110 on the optical axis may be expressed as TP1.

A horizontal distance parallel to the optical axis from an inflection point on the object side 112 of the first lens 110 that is nearest to the optical axis to an intersection point where the object side 112 of the first lens 110 crosses the optical axis may be expressed as SGI111. A horizontal distance parallel to the optical axis from an inflection point on the image side 114 of the first lens 110 that is nearest to the optical axis to an intersection point where the image side 114 of the first lens 110 crosses the optical axis may be expressed as SGI121. The following conditions are satisfied: SGI111=0.2008 mm, SGI121=0.0113 mm, |SGI111|/(|SGI111|+TP1)=0.3018 and |SGI121|/(|SGI121|+TP1)=0.0238.

The distance perpendicular to the optical axis from the inflection point on the object side 112 of the first lens 110 that is nearest to the optical axis to an intersection point where the object side 112 of the first lens 110 crosses the optical axis may be expressed as HIF111. The distance perpendicular to the optical axis from the inflection point on the image side 114 of the first lens 110 that is nearest to the optical axis to an intersection point where the image side 114 of the first lens 110 crosses the optical axis may be expressed as HIF121. The following conditions are satisfied:

HIF111=0.7488 mm, HIF121=0.4451 mm, HIF111/ HOI=0.2552 and HIF121/HOI=0.1517.

The second lens 120 has positive refractive power and is made of plastic. The object side 122 of the second lens 120 is a concave surface and the image side 124 of the second lens 120 is a convex surface, and the object side 122 and the image side 124 of the second lens 120 are aspheric. The object side 122 of the second lens 120 has one inflection point. The length of the maximum effective half diameter outline curve of the object side 122 of the second lens 120 may be expressed as ARS21. The length of the maximum effective half diameter outline curve of the image side 124 of the second lens 120 may be expressed as ARS22. The length of the ½ entrance pupil diameter (HEP) outline curve of the object side 122 of the second lens 120 may be expressed as ARE21. The length of the ½ entrance pupil diameter (HEP) outline curve of the image side 124 of the second lens 120 may be expressed as ARE22. The thickness of the second lens 120 on the optical axis may be expressed as TP2.

A horizontal distance parallel to the optical axis from an inflection point on the object side 122 of the second lens 120 that is nearest to the optical axis to an intersection point where the object side 122 of the second lens 120 crosses optical axis may be expressed as SGI211. A horizontal distance parallel to the optical axis from an inflection point on the image side 124 of the second lens 120 that is nearest to the optical axis to an intersection point where the image side 124 of the second lens 120 crosses the optical axis may be expressed as SGI221. The following conditions are satisfied: SGI211=−0.1791 mm and |SGI211|/(|SGI211|+TP2)=0.3109.

The distance perpendicular to the optical axis from the inflection point on the object side 122 of the second lens 120 that is nearest to the optical axis to an intersection point where the object side 122 of the second lens 120 crosses the optical axis may be expressed as HIF211. The distance perpendicular to the optical axis from the inflection point on the image side 124 of the second lens 120 that is nearest to the optical axis to an intersection point where the image side 124 of the second lens 120 crosses the optical axis may be expressed as HIF221. The following conditions are satisfied: HIF211=0.8147 mm and HIF211/HOI=0.2777.

The third lens 130 has negative refractive power and is made of plastic. The object side 132 of the third lens 130 is a concave surface and the image side 134 of the third lens 130 is a convex surface, and the object side 132 and the image side 134 of the third lens 130 are both aspheric. The image side 134 of the third lens 130 has one inflection point. The length of the maximum effective half diameter outline curve of the object side 132 of the third lens 130 may be expressed as ARS31. The length of the maximum effective half diameter outline curve of the image side 134 of the third lens 130 may be expressed as ARS32. The length of the ½ entrance pupil diameter (HEP) outline curve of the object side 132 of the third lens 130 may be expressed as ARE31. The length of the ½ entrance pupil diameter (HEP) outline curve of the image side 134 of the third lens 130 may be expressed as ARE32. The thickness of the third lens 130 on the optical axis may be expressed as TP3.

A horizontal distance parallel to the optical axis from an inflection point on the object side 132 of the third lens 130 that is nearest to the optical axis to an intersection point where the object side 132 of the third lens 130 crosses the optical axis may be expressed as SGI311. A horizontal distance parallel to the optical axis from an inflection point on the image side 134 of the third lens 130 that is nearest to the optical axis to an intersection point where the image side 134 of the third lens 130 crosses the optical axis may be expressed as SGI321. The following conditions are satisfied: SGI321=−0.1647 mm, and |SGI321|/(|SGI321|+TP3)=0.1884.

The distance perpendicular to the optical axis from the inflection point on the object side 132 of the third lens 130 that is nearest to the optical axis to the optical axis may be expressed as HIF311. The distance perpendicular to the optical axis from the inflection point on the image side 134 of the third lens 130 that is nearest to the optical axis to an intersection point where the image side 134 of the third lens 130 crosses the optical axis may be expressed as HIF321. The following conditions are satisfied: HIF321=0.7269 mm and HIF321/HOI=0.2477.

The fourth lens 140 has negative refractive power and is made of plastic. An object side 142 of the fourth lens 140 is a convex surface and an image side 144 of the fourth lens 140 is a concave surface, and the object side 142 and the image side 144 of the fourth lens 140 are both aspheric. The object side 142 of the fourth lens 140 has two inflection points, and the image side 144 of the fourth lens 140 has one inflection point. The length of the maximum effective half diameter outline curve of the object side 142 of the fourth lens 140 may be expressed as ARS41. The length of the maximum effective half diameter outline curve of the image side 144 of the fourth lens 140 may be expressed as ARS42. The length of the ½ entrance pupil diameter (HEP) outline curve of the object side 142 of the fourth lens 140 may be expressed as ARE41. The length of the ½ entrance pupil diameter (HEP) outline curve of the image side 144 of the fourth lens 140 may be expressed as ARE42. The thickness of the fourth lens 140 on the optical axis may be expressed as TP4.

A horizontal distance parallel to the optical axis from an inflection point on the object side 142 of the fourth lens 140 that is nearest to the optical axis to an intersection point where the object side 142 of the fourth lens 140 crosses the optical axis may be expressed as SGI411. A horizontal distance parallel to the optical axis from an inflection point on the image side 144 of the fourth lens 140 which is nearest to the optical axis to an intersection point where the image side 144 of the fourth lens 140 crosses the optical axis may be expressed as SGI421. The following conditions are satisfied: SGI411=0.0137 mm, SGI421=0.0922 mm, |SGI411|/(|SGI411|+TP4)=0.0155 and |SGI421|/(|SGI421|+TP4)=0.0956.

A horizontal distance parallel to the optical axis from an inflection point on the object side 142 of the fourth lens 140 that is second nearest to the optical axis to an intersection point where the object side 142 of the fourth lens 140 crosses the optical axis may be expressed as SGI412. The following conditions are satisfied: SGI412=−0.1518 mm and |SGI412|/(|SGI412|+TP4)=0.1482.

The distance perpendicular to the optical axis from the inflection point on the object side 142 of the fourth lens 140 that is nearest to the optical axis to the optical axis may be expressed as HIF411. The distance perpendicular to the optical axis from the inflection point on the image side 144 of the fourth lens 140 which is nearest to the optical axis to the optical axis may be expressed as HIF421. The following conditions are satisfied: HIF411=02890 mm, HIF421=0.5794 mm, HIF411/HOI=0.0985 and HIF421/HOI=0.1975.

The distance perpendicular to the optical axis from the inflection point on the object side 142 of the fourth lens 140 that is second nearest to the optical axis to the optical axis may be expressed as HIF412. The following conditions are satisfied: HIF412=1.3328 mm and HIF412/HOI=0.4543.

The infrared filter 170 is made of glass and disposed between the fourth lens 140 and the image plane 180. Besides, the infrared filter 170 does not affect the focal length of the optical image capturing system 10.

In the optical image capturing system 10 of the first embodiment, the focal length of the optical image capturing system 10 may be expressed as f, the entrance pupil diameter of the optical image capturing system 10 may be expressed as HEP, and a half maximum angle of view of the optical image capturing system 10 may be expressed as HAF. The detailed are shown as follows: f=3.4375 mm, f/HEP=2.23, HAF=39.69 deg. and tan(HAF)=0.8299.

In the optical image capturing system 10 of the first embodiment, the focal length of the first lens 110 may be expressed as f1, and the focal length of the fourth lens 140 may be expressed as f4. The following conditions are satisfied: f1=3.2736 mm, |f/f1|=1.0501, f4=−8.3381 mm and |f1/f4|=0.3926.

In the optical image capturing system of the first embodiment, the focal length of the second lens 120 may be expressed as f2, and the focal length of the third lens 130 may be expressed as f3. The following conditions are satisfied: |f2|+|f3|=10.0976 mm, |f1|+|f4|=11.6116 mm and |f2|+|f3|<|f1|+|f4|.

The ratio of the focal length f of the optical image capturing system to a focal length fp of each of lenses with positive refractive power may be expressed as PPR. The ratio of the focal length f of the optical image capturing system 10 to a focal length fn of each of lenses with negative refractive power may be expressed as NPR. In the optical image capturing system 10 of the first embodiment, a sum of the PPR of all lenses with positive refractive power may be expressed as ΣPPR=|f/f1|+|f/f2|=1.95585, and a sum of the NPR of all lenses with negative refractive power may be expressed as ΣNPR=|f/f3|+|f/f4|=0.95770, wherein ΣPPR/|ΣNPR|=2.04224. The following conditions are also satisfied: |f/f1|=1.05009, |f/f2|=0.90576, |f/f3|=0.54543 and |f/f4|=0.41227.

In the optical image capturing system 10 of the first embodiment, the distance from the object side 112 of the first lens 110 to the image side 144 of the fourth lens 140 may be expressed as InTL. The distance from the object side 112 of the first lens 110 to the image plane 180 may be expressed as HOS. The distance from the aperture 100 to the image plane 180 may be expressed as InS. A half diagonal length of an effective sensing field of the image sensing device 190 may be expressed as HOI. The distance from the image side 144 of the fourth lens 140 to the image plane 180 may be expressed as InB. The following conditions are satisfied: InTL+InB=HOS, HOS=4.4250 mm, HOI=2.9340 mm, HOS/HOI=1.5082, HOS/f=1.2873, InTL/HOS=0.7191, InS=4.2128 mm and InS/HOS=0.95204.

In the optical image capturing system 10 of the first embodiment, the sum of thicknesses of all lenses with refractive power on the optical axis may be expressed as ΣTP. The following conditions are satisfied: ΣTP=2.4437 mm and ΣTP/InTL=0.76793. Therefore, contrast ratio of the image in the optical image capturing system 10 and the yield rate of manufacturing the lenses may be achieved at the same time, and an appropriate back focal length may be provided so as to accommodate other optical elements in the optical image capturing system 10.

In the optical image capturing system 10 of the first embodiment, the curvature radius of the object side 112 of the first lens 110 may be expressed as R1. The curvature radius of the image side 114 of the first lens 110 may be expressed as R2. The following condition is satisfied: |R1/R2|=0.1853. Hence, the first lens 110 has a suitable magnitude of the positive refractive power, so as to prevent the spherical aberration from increasing too fast.

In the optical image capturing system 10 of the first embodiment, the curvature radius of the object side 142 of the fourth lens 140 may be expressed as R7. The curvature radius of the image side 144 of the fourth lens 140 may be expressed as R8. The following condition is satisfied: (R7−R8)/(R7+R8)=0.2756. Hence, the configuration is beneficial for correcting the astigmatism generated by the optical image capturing system 10.

In the optical image capturing system 10 of the first embodiment, a focal length of the first lens 110 may be expressed as f1, a focal length of the second lens 120 may be expressed as f2, and the sum of the focal lengths of all lenses with positive refractive power may be expressed as ΣPP, which meets the following conditions: ΣPP=f1+f2=7.0688 mm, and f1/(f1+f2)=0.4631. Therefore, the configuration is beneficial for distributing the positive refractive power of the first lens 110 to other lenses with positive refractive power appropriately, so as to suppress noticeable aberrations generated in the propagating process of the incident light.

In the optical image capturing system of the first embodiment, a focal length of the third lens 130 may be expressed as f3, a focal length of the fourth lens 140 may be expressed as f4, and the sum of the focal lengths of all lenses with negative refractive power may be expressed as ΣNP, which meets the following conditions: ΣNP=f3+f4=−14.6405 mm, and f1/ΣNP=0.5695. Therefore, the configuration is beneficial to distribute the negative refractive power of the first lens 110 to other lenses with negative refractive power appropriately, so as to suppress noticeable aberrations generated in the propagating process of the incident light.

In the optical image capturing system 10 of the first embodiment, the distance between the first lens 110 and the second lens 120 on the optical axis may be expressed as IN12. The following conditions are satisfied: IN12=0.3817 mm, and IN12/f=0.11105. Hence, the configuration is beneficial for improving the chromatic aberration of the lenses so as to improve the performance thereof.

In the optical image capturing system 10 of the first embodiment, the distance between the second lens 120 and the third lens 130 on the optical axis may be expressed as IN23. The following conditions are satisfied: IN23=0.0704 mm, IN23/f=0.02048. Hence, the configuration is beneficial for improving the chromatic aberration of the lenses so as to improve the performance thereof.

In the optical image capturing system 10 of the first embodiment, the distance between the third lens 130 and the fourth lens 140 on the optical axis may be expressed as IN34. The following conditions are satisfied: IN34=0.2863 mm and IN34/f=0.08330. Hence, the configuration is beneficial for improving the chromatic aberration of the lenses so as to improve the performance thereof.

In the optical image capturing system 10 of the first embodiment, thicknesses of the first lens 110 and the second lens 120 on the optical axis may be expressed as TP1 and TP2, respectively. The following conditions are satisfied: TP1=0.46442 mm, TP2=0.39686 mm, TP1/TP2=1.17023 and (TP1+IN12)/TP2=2.13213. Hence, the configuration is helpful to control the sensitivity produced by the optical image capturing system, and reduce the total height of the optical image capturing system.

In the optical image capturing system 10 of the first embodiment, thicknesses of the third lens 130 and the fourth lens 140 on the optical axis may be expressed as TP3 and TP4, respectively. The distance between the aforementioned two lenses on the optical axis may be expressed as IN34. The following conditions are satisfied: TP3=0.70989 mm, TP4=0.87253 mm, TP3/TP4=0.81359 and (TP4+IN34)/TP3=1.63248. Hence, the configuration is helpful to control the sensitivity produced by the optical image capturing system, and reduce the total height of the optical image capturing system.

In the optical image capturing system 10 of the first embodiment, the following condition is satisfied: IN23/(TP2+IN23+TP3)=0.05980. Therefore, this configuration is helpful to slightly correct the aberration of the propagating process of the incident light layer by layer, and decrease the total height of the optical image capturing system.

In the optical image capturing system 10 of the first embodiment, a horizontal distance parallel to the optical axis from a maximum effective half diameter position on the object side 142 of the fourth lens 140 to an intersection point where the object side 142 of the fourth lens 140 crosses the optical axis and may be expressed as InRS41. A horizontal distance parallel to the optical axis from a maximum effective half diameter position on the image side 144 of the fourth lens 140 to an intersection point where the image side 144 of the fourth lens 140 crosses the optical axis and may be expressed as InRS42. A thickness of the fourth lens 140 on the optical axis may be expressed as TP4. The following conditions are satisfied: InRS41=−0.23761 mm, InRS42=−0.20206 mm, |InRS41|+|InRS42|=0.43967 mm, |InRS41|/TP4=0.27232 and |InRS42|/TP4=0.23158. Hence, the configuration is beneficial to manufacture and form the lenses, and to keep the miniaturization of the optical image capturing system effectively.

In the optical image capturing system 10 of the first embodiment, the distance perpendicular to the optical axis between a critical point C41 on the object side 142 of the fourth lens 140 and the optical axis may be expressed as HVT41. The distance perpendicular to the optical axis between a critical point C42 on the image side 144 of the fourth lens 140 and the optical axis may be expressed as HVT42. The following conditions are satisfied: HVT41=0.5695 mm, HVT42=1.3556 mm and HVT41/HVT42=0.4021. Therefore, the configuration may amend the aberration of off-axis rays.

In the optical image capturing system 10 of the present embodiment, the following condition is satisfied: HVT42/HOI=0.4620. Hereby, the configuration is helpful to amend the aberration of the peripheral field of view of the optical image capturing system.

In the optical image capturing system 10 of the present embodiment, the following condition is satisfied: HVT42/HOS=0.3063. Hereby, the configuration is helpful to amend the aberration of the peripheral field of view of the optical image capturing system.

In the optical image capturing system 10 of the first embodiment, the coefficient of dispersion of the first lens 110 may be expressed as NA1. The coefficient of dispersion of the second lens 120 may be expressed as NA2. The coefficient of dispersion of the third lens 130 may be expressed as NA3. The coefficient of dispersion of the fourth lens 140 may be expressed as NA4. The following condition is satisfied: |NA1−NA2|=0 and NA3/NA2=0.39921. Hence, the configuration is helpful to amend the chromatic aberration of the optical image capturing system.

In the optical image capturing system 10 of the first embodiment, the TV distortion and optical distortion when forming image in the optical image capturing system 10 may be expressed as TDT and ODT, respectively. The following conditions are satisfied: TDT=0.4% and ODT=2.5%.

In the optical image capturing system 10 of the first embodiment, the lateral aberration of the longest operation wavelength of visible light of a positive tangential fan diagram passing through a margin of the aperture 100 and incident on the image plane 180 at 0.7 field of view may be expressed as PLTA and its value is 0.001 mm (Pixel Size: 1.12 μm). The lateral aberration of the shortest operation wavelength of visible light of the positive tangential fan diagram passing through the margin of the aperture 100 and incident on the image plane 180 at 0.7 field of view may be expressed as PSTA and its value is 0.004 mm (Pixel Size: 1.12 μm). The lateral aberration of the longest operation wavelength of visible light of the negative tangential fan diagram passing through the margin of the aperture 100 and incident on the image plane 180 at 0.7 field of view may be expressed as NLTA and its value is 0.003 mm (Pixel Size: 1.12 μm). The lateral aberration of the shortest operation wavelength of a visible light of the negative tangential fan diagram passing through the margin of the aperture 100 and incident on the image plane 180 at 0.7 field of view may be expressed as NSTA and its value is −0.003 mm (Pixel Size: 1.12 μm). The lateral aberration of the longest operation wavelength of visible light of a sagittal fan diagram passing through the margin of the aperture 100 and incident on the image plane 180 at 0.7 field of view may be expressed as SLTA and its value is 0.003 mm (Pixel Size: 1.12 μm). The lateral aberration of the shortest operation wavelength of visible light of the sagittal fan diagram passing through the margin of the aperture 100 and incident on the image plane 180 at 0.7 field of view may be expressed as SSTA and its value is 0.004 mm.

Table 1 and Table 2 below should be incorporated into the reference of the present embodiment.

TABLE 1

Lens Parameter for the First Embodiment
f (focal length) = 3.4375 mm; f/HEP = 2.23;
HAF (half angle of view) = 39.6900 deg; tan(HAF) = 0.8299;

| Surface No. | | Curvature Radius | Thickness | Material |
|---|---|---|---|---|
| 0 | Object | Plane | At infinity | |
| 1 | First Lens/ Aperture | 1.466388 | 0.464000 | Plastic |
| 2 | | 7.914480 | 0.382000 | |
| 3 | Second Lens | −5.940659 | 0.397000 | Plastic |
| 4 | | −1.551401 | 0.070000 | |
| 5 | Third Lens | −0.994576 | 0.710000 | Plastic |
| 6 | | −1.683933 | 0.286000 | |
| 7 | Fourth Lens | 2.406736 | 0.873000 | Plastic |
| 8 | | 1.366640 | 0.213000 | |
| 9 | Infrared Filter | Plane | 0.210000 | BK7_SCHOTT |
| 10 | | Plane | 0.820000 | |
| 11 | Image Plane | Plane | | |

| Surface No. | Refractive Index | Coefficient of Dispersion | Focal Length |
|---|---|---|---|
| 0 | | | |
| 1 | 1.535 | 56.07 | 3.274 |

TABLE 1-continued

Lens Parameter for the First Embodiment
f (focal length) = 3.4375 mm; f/HEP = 2.23;
HAF (half angle of view) = 39.6900 deg; tan(HAF) = 0.8299;

| | | | |
|---|---|---|---|
| 2 | | | |
| 3 | 1.535 | 56.07 | 3.795 |
| 4 | | | |
| 5 | 1.642 | 22.46 | −6.302 |
| 6 | | | |
| 7 | 1.535 | 56.07 | −8.338 |
| 8 | | | |
| 9 | 1.517 | 64.13 | |
| 10 | | | |
| 11 | | | |

Reference Wavelength = 555 nm. Shield Position: the 8th surface with effective aperture radius = 2.320 mm

TABLE 2

Aspheric Coefficients of the First Embodiment
Table 2: Aspheric Coefficients

| Surface No. | 1 | 2 | 3 | 4 |
|---|---|---|---|---|
| k = | −1.595426E+00 | −7.056632E+00 | −2.820679E+01 | −1.885740E+00 |
| A4 = | −4.325520E−04 | −2.633963E−02 | −1.367865E−01 | −9.745260E−02 |
| A6 = | 1.103749E+00 | 2.088207E−02 | 3.135755E−01 | −1.032177E+00 |
| A8 = | −8.796867E+00 | −1.122861E−01 | −6.149514E+00 | 8.016230E+00 |
| A10 = | 3.981982E+01 | −7.137813E−01 | 3.883332E+01 | −4.215882E+01 |
| A12 = | −1.102573E+02 | 2.236312E+00 | −1.463622E+02 | 1.282874E+02 |
| A14 = | 1.900642E+02 | −2.756305E+00 | 3.339863E+02 | −2.229568E+02 |
| A16 = | −2.000279E+02 | 1.557080E+00 | −4.566510E+02 | 2.185571E+02 |
| A18 = | 1.179848E+02 | −2.060190E+00 | 3.436469E+02 | −1.124538E+02 |
| A20 = | −3.023405E+01 | 2.029630E+00 | −1.084572E+02 | 2.357571E+01 |

| Surface No. | 5 | 6 | 7 | 8 |
|---|---|---|---|---|
| k = | 1.013988E−01 | −3.460337E+01 | −4.860907E+01 | −7.091499E+00 |
| A4 = | 2.504976E−01 | −9.580611E−01 | −2.043197E−01 | −8.148585E−02 |
| A6 = | −1.640463E+00 | 3.303418E+00 | 6.516636E−02 | 3.050566E−02 |
| A8 = | 1.354700E+01 | −8.544412E+00 | 4.863926E−02 | −8.218175E−03 |
| A10 = | −6.223343E+01 | 1.602487E+01 | −7.086809E−02 | 1.186528E−03 |
| A12 = | 1.757259E+02 | −2.036011E+01 | 3.815824E−02 | −1.305021E−04 |
| A14 = | −2.959459E+02 | 1.703516E+01 | −1.032930E−02 | 2.886943E−05 |
| A16 = | 2.891641E+02 | −8.966359E+00 | 1.413303E−03 | −6.459004E−06 |
| A18 = | −1.509364E+02 | 2.684766E+00 | −8.701682E−05 | 6.571792E−07 |
| A20 = | 3.243879E+01 | −3.481557E−01 | 1.566415E−06 | −2.325503E−08 |

The values pertaining to the length of the outline curves are obtainable from the data in Table 1 and Table 2:

First Embodiment (Primary Reference Wavelength = 555 nm)

| ARE | 1/2(HEP) | ARE value | ARE − 1/2(HEP) | 2(ARE/HEP) % | TP | ARE/TP(%) |
|---|---|---|---|---|---|---|
| 11 | 0.771 | 0.808 | 0.037 | 104.77% | 0.464 | 173.90% |
| 12 | 0.771 | 0.771 | 0.000 | 99.99% | 0.464 | 165.97% |
| 21 | 0.771 | 0.797 | 0.026 | 103.38% | 0.397 | 200.80% |
| 22 | 0.771 | 0.828 | 0.057 | 107.37% | 0.397 | 208.55% |
| 31 | 0.771 | 0.832 | 0.061 | 107.97% | 0.710 | 117.25% |
| 32 | 0.771 | 0.797 | 0.026 | 103.43% | 0.710 | 112.32% |
| 41 | 0.771 | 0.771 | 0.000 | 100.05% | 0.873 | 88.39% |
| 42 | 0.771 | 0.784 | 0.013 | 101.69% | 0.873 | 89.84% |

| ARS | EHD | ARS value | ARS − EHD | (ARS/EHD)% | TP | ARS/TP(%) |
|---|---|---|---|---|---|---|
| 11 | 0.771 | 0.808 | 0.037 | 104.77% | 0.464 | 173.90% |
| 12 | 0.812 | 0.814 | 0.002 | 100.19% | 0.464 | 175.25% |
| 21 | 0.832 | 0.877 | 0.045 | 105.37% | 0.397 | 220.98% |
| 22 | 0.899 | 1.015 | 0.116 | 112.95% | 0.397 | 255.83% |
| 31 | 0.888 | 0.987 | 0.098 | 111.07% | 0.710 | 138.98% |
| 32 | 1.197 | 1.237 | 0.041 | 103.41% | 0.710 | 174.31% |
| 41 | 1.642 | 1.689 | 0.046 | 102.81% | 0.873 | 193.53% |
| 42 | 2.320 | 2.541 | 0.221 | 109.54% | 0.873 | 291.23% |

Table 1 is the detailed structural data for the first embodiment in FIG. 1, wherein the unit of the curvature radius, the thickness, the distance and the focal length is millimeter (mm), and surfaces 0-14 illustrate the surfaces in the order from the object side to the image plane of the optical image capturing system. Table 2 shows the aspheric coefficients of the first embodiment, wherein k is the conic coefficient in the aspheric surface curve equation, and $A_1$-$A_{20}$ are the first to the twentieth order aspheric surface coefficients respectively. Besides, the tables of following embodiments exactly correspond to their respective schematic views and the diagrams of aberration curves, and the definitions of parameters therein are identical to those in the Table 1 and the Table 2 of the first embodiment, so that the repetitive details are not stated here.

Second Embodiment

Figure 2A:
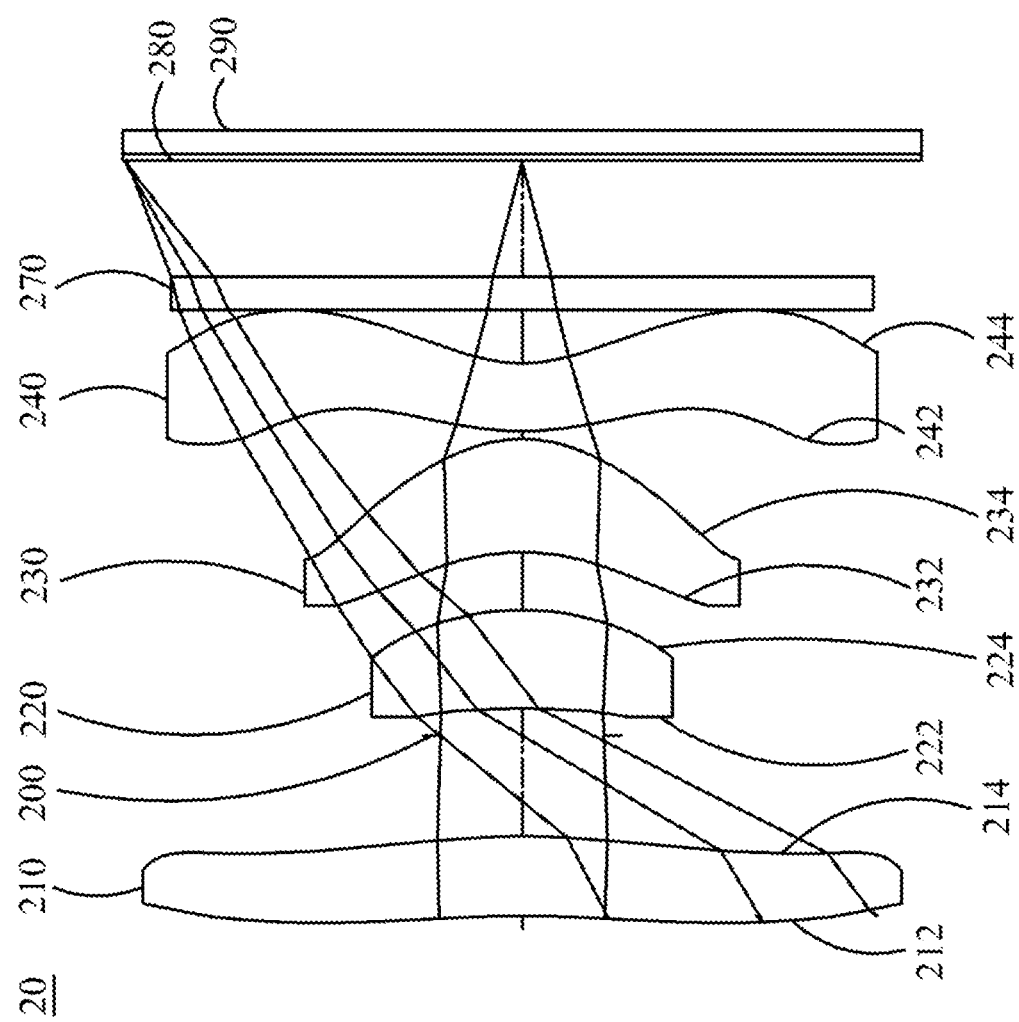
FIG. 2A is a schematic view of the optical image capturing system according to the second embodiment of the present invention.
Figure 2B:
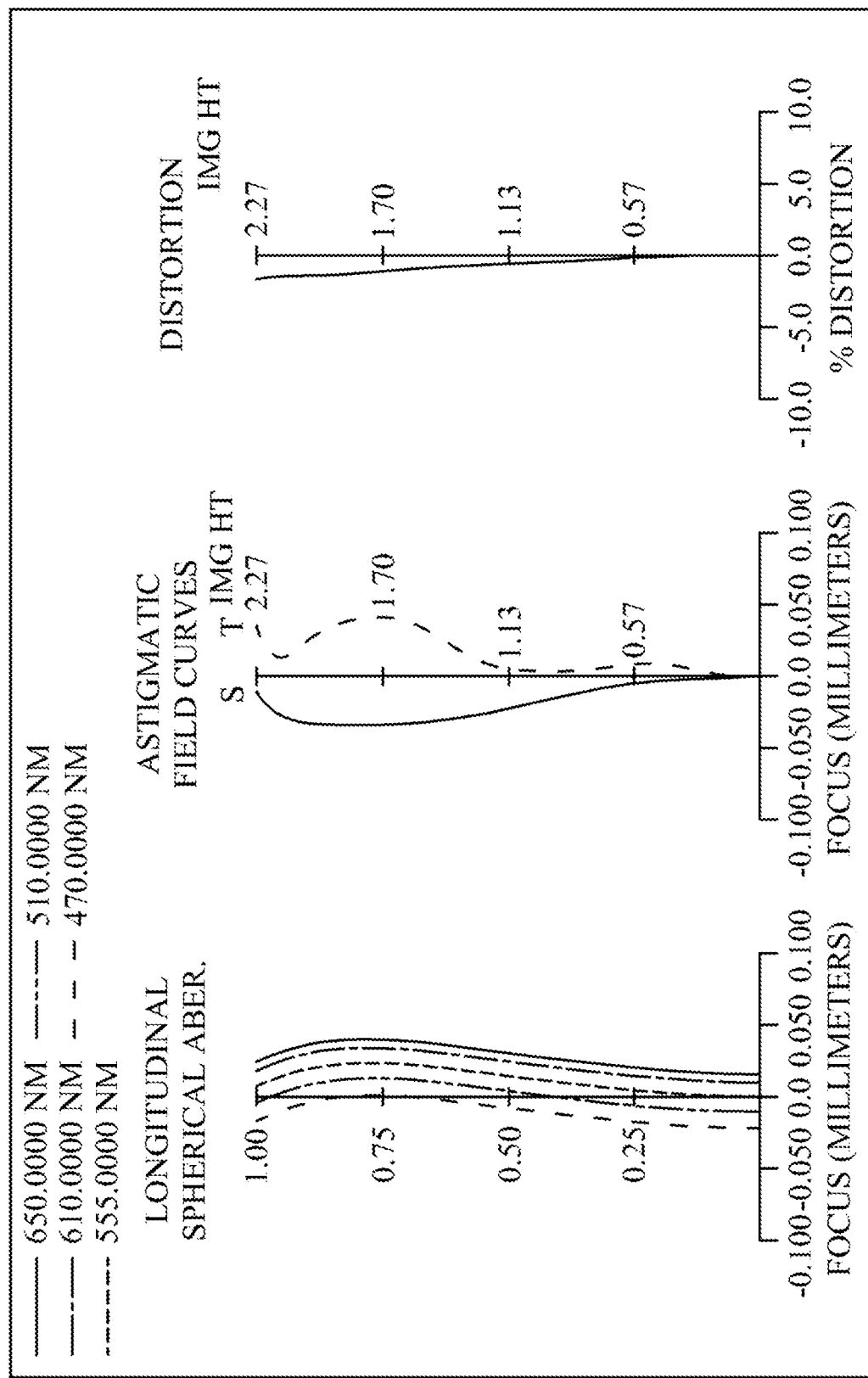
FIG. 2B is a curve diagram illustrating the spherical aberration, astigmatism and optical distortion of the optical image capturing system in the sequence from left to right according to the second embodiment of the present invention.
Figure 2C:
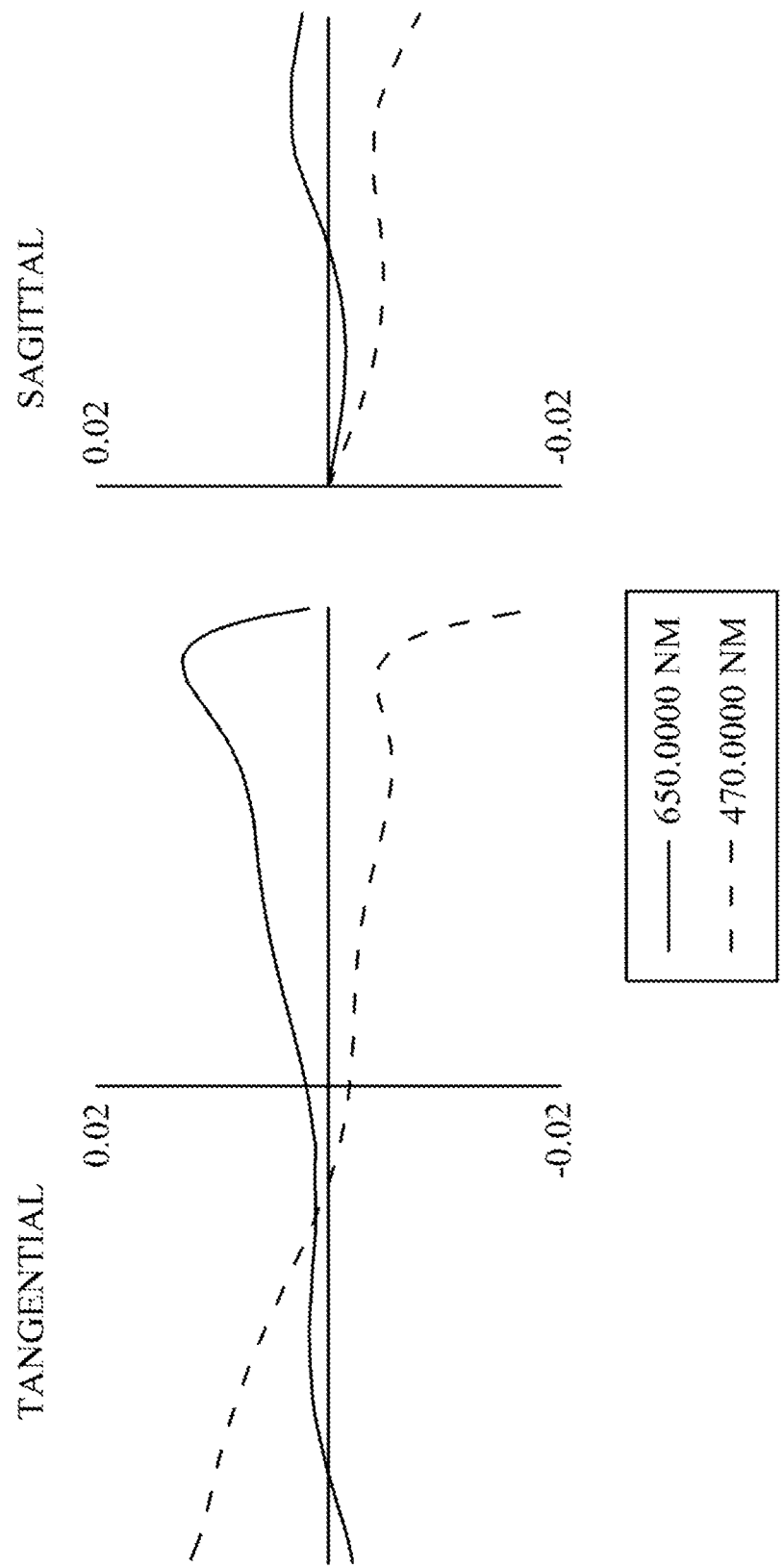
FIG. 2C shows the sagittal fan and the tangential fan of the optical image capturing system and the lateral aberration diagram of the longest operation wavelength and the shortest operation wavelength passing thorough the margin of the aperture at 0.7 field of view according to the second embodiment of the present invention.

Please refer to FIGS. 2A and 2B, wherein FIG. 2A is a schematic view of the optical image capturing system according to the second embodiment of the present invention. FIG. 2B is a curve diagram illustrating the spherical aberration, astigmatism and optical distortion of the optical image capturing system in the sequence from left to right according to the second embodiment of the present invention. FIG. 2C shows the sagittal fan and the tangential fan of the optical image capturing system and the lateral aberration diagram of the longest operation wavelength and the shortest operation wavelength passing thorough the margin of the aperture at 0.7 field of view according to the second embodiment of the present invention.

As shown in FIG. 2A, in the order from an object side to an image side, the optical image capturing system 20 includes a first lens 210, an aperture 200, a second lens 220, a third lens 230, a fourth lens 240, an infrared filter 270, an image plane 280 and an image sensing device 290.

The first lens 210 has positive refractive power and is made of plastic. The object side 212 of the first lens 210 is a concave surface, the image side 214 of the first lens 210 is a convex surface and the image side 214 and the object side 212 of the first lens 210 are both aspheric. The image side 214 and the object side 212 of the first lens 210 both have one inflection point.

The second lens 220 has positive refractive power and is made of plastic. The object side 222 of the second lens 220 is a concave surface and the image side 224 of the second lens 220 is a convex surface, and the object side 222 and an image side 224 of the second lens 220 are both aspheric. The image side 224 of the second lens 220 has one inflection point.

The third lens 230 has positive refractive power and is made of plastic. The object side 232 of the third lens 230 is a concave surface and the image side 234 of the third lens 230 is a convex surface, and the object side 232 and an image side 234 of the third lens 230 are both aspheric. The image side 234 and the object side 232 of the third lens 230 both have one inflection point.

The fourth lens 240 has negative refractive power and is made of plastic. The object side 242 of the fourth lens 240 is a convex surface and the image side 244 of the fourth lens 240 is a concave surface, and the object side 242 and the image side 244 of the fourth lens 240 are both aspheric. The object side 242 of the fourth lens 240 has two inflection points and the image side 244 of the fourth lens 240 has one inflection point.

The infrared filter 270 is made of glass and is disposed between the fourth lens 240 and the image plane 280. The infrared filter 270 does not affect the focal length of the optical image capturing system 20.

Table 3 and Table 4 below should be incorporated into the reference of the present embodiment.

TABLE 3

Lens Parameter for the Second Embodiment
f (focal length) = 2.10143 mm; f/HEP = 2.22;
HAF (half angle of view) = 47.5497 deg

| Surface No. | | Curvature Radius | Thickness (mm) | Material |
|---|---|---|---|---|
| 0 | Object | 1E+18 | 1E+11 | |
| 1 | First Lens | −11.88977536 | 0.613 | Plastic |
| 2 | | −5.913154724 | 0.628 | |
| 3 | Aperture | 1E+18 | 0.209 | |
| 4 | Second Lens | −6.180637094 | 0.391 | Plastic |
| 5 | | −1.649843547 | 0.135 | |
| 6 | Third Lens | −1.647323656 | 1.041 | Plastic |
| 7 | | −0.751718424 | 0.025 | |
| 8 | Fourth Lens | 2.157604558 | 0.560 | Plastic |
| 9 | | 0.823100315 | 0.313 | |
| 10 | Infrared Filter | 1E+18 | 0.210 | BK7_SCHOTT |
| 11 | | 1E+18 | 0.845 | |
| 12 | Image Plane | 1E+18 | 0.000 | |

| Surface No. | Refractive Index | Coefficient of Dispersion | Focal Length |
|---|---|---|---|
| 0 | | | |
| 1 | 1.636 | 23.879 | 17.882 |
| 2 | | | |
| 3 | | | |
| 4 | 1.545 | 55.938 | 4.019 |
| 5 | | | |
| 6 | 1.545 | 55.938 | 1.805 |
| 7 | | | |
| 8 | 1.636 | 23.879 | −2.511 |
| 9 | | | |
| 10 | 1.517 | 64.13 | |
| 11 | | | |
| 12 | | | |

Reference Wavelength = 555 nm. Shield Position: the 1st surface with effective aperture radius = 1.988 mm; the 2nd surface with effective aperture radius = 1.739 mm; the 4th surface with effective aperture radius = 0.746 mm; the 6th surface with effective aperture radius = 1.237 mm; the 8th surface with effective aperture radius = 2.030 mm.

TABLE 4

The Aspheric Coefficients of the Second Embodiment
Table 4: Aspheric Coefficients

| Surface No. | 1 | 2 | 4 | 5 |
|---|---|---|---|---|
| k = | 0.000000E+00 | 0.000000E+00 | 0.000000E+00 | 0.000000E+00 |
| A4 = | 7.878770E−02 | 1.382302E−02 | −2.177785E−01 | −1.682374E−02 |
| A6 = | −3.867733E−02 | −1.225176E−01 | −1.703155E+00 | −1.758705E+00 |
| A8 = | 1.837466E−02 | 8.254309E−02 | 1.649357E+01 | 1.106593E+01 |
| A10 = | −7.240358E−03 | −3.798359E−02 | −9.999967E+01 | −4.688490E+01 |
| A12 = | 2.050255E−03 | 1.155461E−02 | 3.226780E+02 | 1.129285E+02 |
| A14 = | −3.390119E−04 | −2.133031E−03 | −5.929810E+02 | −1.486292E+02 |
| A16 = | 2.378922E−05 | 1.817664E−04 | 5.092632E+02 | 8.253415E+01 |

| Surface No. | 6 | 7 | 8 | 9 |
|---|---|---|---|---|
| k = | 0.000000E+00 | −8.634555E−01 | 0.000000E+00 | −4.919196E+00 |
| A4 = | 1.868390E−01 | 3.359970E−01 | −2.150156E−01 | −9.940599E−02 |
| A6 = | −9.653348E−01 | −5.772393E−01 | 2.397846E−02 | 2.997505E−02 |
| A8 = | 3.356111E+00 | 7.411406E−01 | 2.39993 5E−02 | −6.462542E−03 |
| A10 = | −7.254689E+00 | −6.088032E−01 | −1.370006E−02 | 8.465780E−04 |
| A12 = | 9.674105E+00 | 3.073818E−01 | 3.166576E−03 | −9.913837E−05 |
| A14 = | −6.640191E+00 | −6.343459E−02 | −2.847702E−04 | 8.114679E−06 |
| A16 = | 1.771387E+00 | 0.000000E+00 | 0.000000E+00 | 0.000000E+00 |

In the second embodiment, the form of the aspheric surface equation therein is presented as that in the first embodiment. Furthermore, the definition of parameters in the following tables is equivalent to that in the first embodiment, so that the repetitive details are not stated here.

The following conditional values may be obtained according to the data in Table 3 and Table 4.

Second Embodiment (Primary reference wavelength = 555 nm)

| InRS41 | InRS42 | HVT41 | HVT42 | ODT % | TDT % |
|---|---|---|---|---|---|
| −0.06772 | 0.16797 | 0.84993 | 1.33288 | −1.70508 | 1.05174 |
| \| f/f1 \| | \| f/f2 \| | \| f/f3 \| | \| f/f4 \| | \| f1/f2 \| | \| f2/f3 \| |
| 0.11752 | 0.52283 | 1.16394 | 0.83675 | 4.44903 | 2.22620 |
| ΣPPR | ΣNPR | ΣPPR/\|ΣNPR\| | ΣPP | ΣNP | f1/ΣPP |
| 1.68677 | 0.95427 | 1.76761 | 5.82475 | 15.37059 | 0.69004 |
| f4/ΣNP | IN12/f | IN23/f | IN34/f | TP3/f | TP4/f |
| 1.16339 | 0.39826 | 0.06437 | 0.01190 | 0.49535 | 0.26628 |
| InTL | HOS | HOS/HOI | InS/HOS | InTL/HOS | ΣTP/InTL |
| 3.60175 | 4.97000 | 2.19523 | 0.75030 | 0.72470 | 0.72314 |
| (TP1 + IN12)/TP2 | (TP4 + IN34)/TP3 | TP1/TP2 | TP3/TP4 | IN23/(TP2 + IN23 + TP3) | |
| 3.70686 | 0.56157 | 1.56709 | 1.86029 | 0.08630 | |
| \|InRS41\|/TP4 | \|InRS42\|/TP4 | HVT42/HOI | HVT4/HOS | | |
| 0.1210 | 0.3002 | 0.5887 | 0.2682 | | |
| PLTA | PSTA | NLTA | NSTA | SLTA | SSTA |
| −0.014 mm | 0.005 mm | −0.000 mm | −0.016 mm | −0.002 mm | 0.008 mm |

The following conditional values may be obtained according to the data in Table 3 and Table 4.

Values Related to Inflection Point of Second Embodiment
(Primary Reference Wavelength = 555 nm)

| HIF111 | 0.3168 | HIF111/HOI | 0.1399 |
|---|---|---|---|
| HIF121 | 0.3718 | HIF121/HOI | 0.1642 |
| HIF221 | 0.7277 | HIF221/HOI | 0.3214 |
| HIF311 | 0.6968 | HIF311/HOI | 0.3078 |
| HIF321 | 0.9664 | HIF321/HOI | 0.4268 |
| HIF411 | 0.4565 | HIF411/HOI | 0.2016 |
| HIF412 | 1.4532 | HIF412/HOI | 0.6419 |
| HIF421 | 0.5378 | HIF421/HOI | 0.2375 |
| SGI111 | −0.0035 | \|SGI111\|/(\|SGI111\| + TP1) | 0.0056 |
| SGI121 | −0.0094 | \|SGI121\|/(\|SGI121\| + TP1) | 0.0150 |
| SGI221 | −0.2522 | \|SGI221\|/(\|SGI221\| + TP2) | 0.3920 |
| SGI311 | −0.1403 | \|SGI311\|/(\|SGI311\| + TP3) | 0.1188 |
| SGI321 | −0.5420 | \|SGI321\|/(\|SGI321\| + TP3) | 0.3424 |
| SGI411 | 0.0398 | \|SGI411\|/(\|SGI411\| + TP4) | 0.0663 |
| SGI412 | −0.0409 | \|SGI412\|/(\|SGI412\| + TP4) | 0.0680 |
| SGI421 | 0.1257 | \|SGI421\|/(\|SGI421\| + TP4) | 0.1834 |

The values pertaining to the length of the outline curves are obtainable from the data in Table 3 and Table 4:

Second Embodiment (Primary reference wavelength = 555 nm)

| ARE | 1/2(HEP) | ARE value | ARE − 1/2(HEP) | 2(ARE/HEP)% | TP | ARE/TP(%) |
|---|---|---|---|---|---|---|
| 11 | 0.473 | 0.473 | −0.00025 | 99.95% | 0.613 | 77.18% |
| 12 | 0.473 | 0.473 | −0.00008 | 99.98% | 0.613 | 77.21% |
| 21 | 0.473 | 0.475 | 0.00210 | 100.44% | 0.391 | 121.55% |
| 22 | 0.473 | 0.482 | 0.00867 | 101.83% | 0.391 | 123.22% |
| 31 | 0.473 | 0.479 | 0.00564 | 101.19% | 1.041 | 46.01% |
| 32 | 0.473 | 0.498 | 0.02516 | 105.32% | 1.041 | 47.88% |
| 41 | 0.473 | 0.475 | 0.00200 | 100.42% | 0.560 | 84.94% |
| 42 | 0.473 | 0.486 | 0.01320 | 102.79% | 0.560 | 86.94% |

| ARS | EHD | ARS value | ARS − EHD | (ARS/EHD)% | TP | ARS/TP(%) |
|---|---|---|---|---|---|---|
| 11 | 1.988 | 2.038 | 0.050 | 102.52% | 0.613 | 332.57% |
| 12 | 1.739 | 1.747 | 0.009 | 100.49% | 0.613 | 285.08% |
| 21 | 0.592 | 0.602 | 0.010 | 101.71% | 0.391 | 154.02% |
| 22 | 0.746 | 0.820 | 0.073 | 109.84% | 0.391 | 209.60% |
| 31 | 0.950 | 0.977 | 0.027 | 102.87% | 1.041 | 93.85% |
| 32 | 1.237 | 1.488 | 0.251 | 120.30% | 1.041 | 142.96% |
| 41 | 1.685 | 1.712 | 0.027 | 101.58% | 0.560 | 305.88% |
| 42 | 2.030 | 2.120 | 0.090 | 104.43% | 0.560 | 378.85% |

Third Embodiment

Figure 3A:
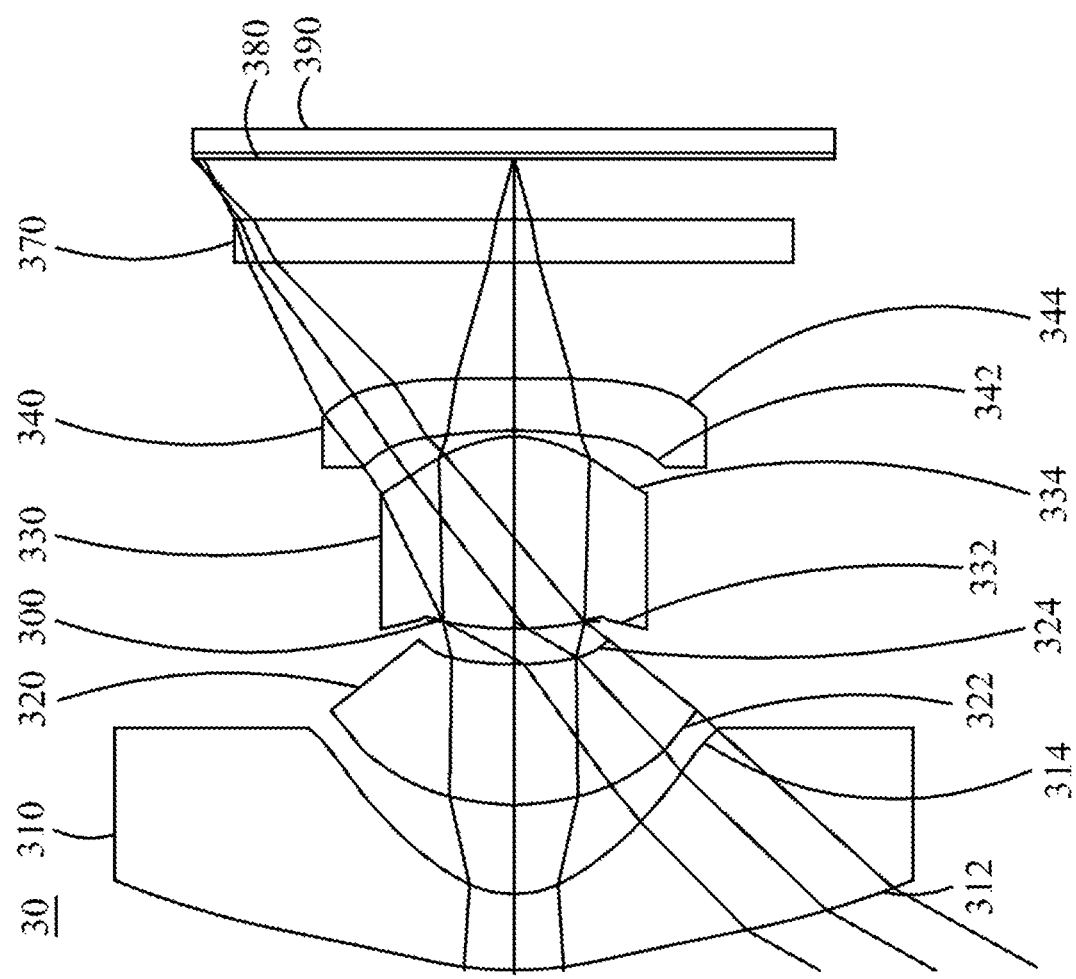
FIG. 3A is a schematic view of the optical image capturing system according to the third embodiment of the present invention.
Figure 3B:
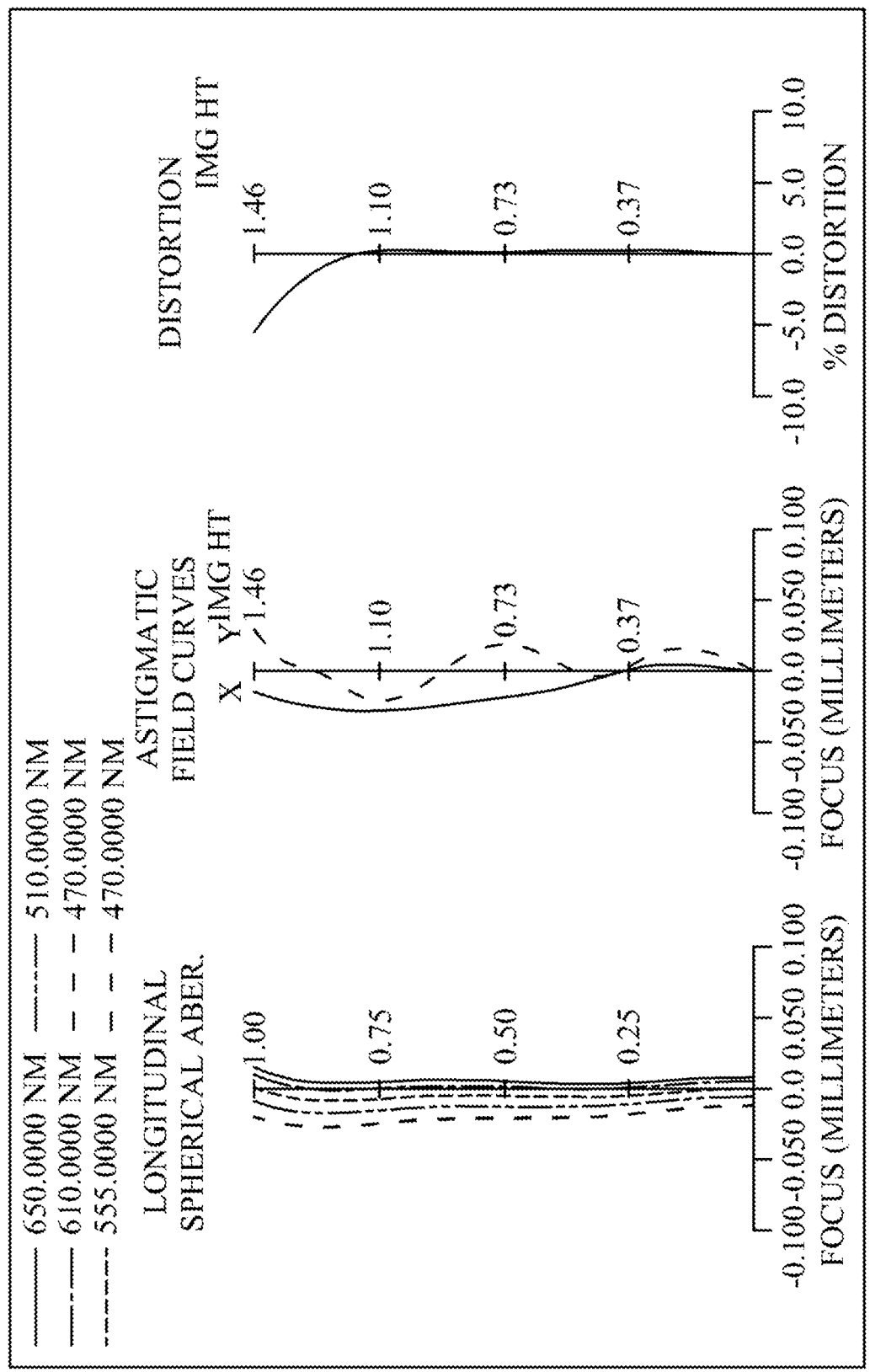
FIG. 3B a curve diagram illustrating the spherical aberration, astigmatism and optical distortion of the optical image capturing system in the sequence from left to right according to the third embodiment of the present invention.
Figure 3C:
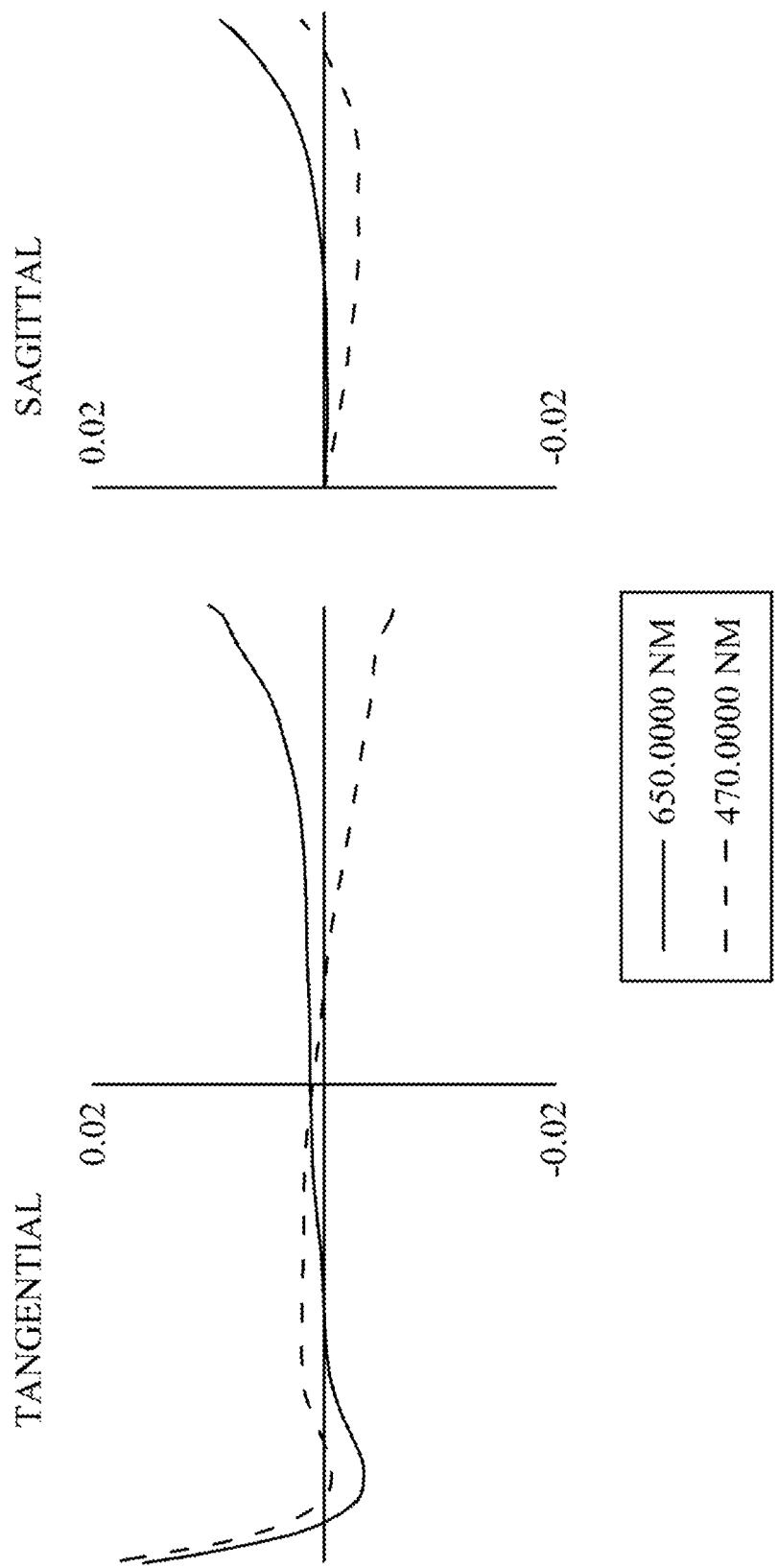
FIG. 3C shows the sagittal fan and the tangential fan of the optical image capturing system and the lateral aberration diagram of the longest operation wavelength and the shortest operation wavelength passing thorough the margin of the aperture at 0.7 field of view according to the third embodiment of the present invention.

Please refer to FIGS. 3A and 3B, wherein FIG. 3A is a schematic view of the optical image capturing system according to the third embodiment of the present invention. FIG. 3B is a curve diagram illustrating the spherical aberration, astigmatism and optical distortion of the optical image capturing system in the sequence from left to right according to the third embodiment of the present invention. FIG. 3C shows the sagittal fan and the tangential fan of the optical image capturing system and the lateral aberration diagram of the longest operation wavelength and the shortest operation wavelength passing thorough the margin of the aperture at 0.7 field of view according to the third embodiment of the present invention.

As shown in FIG. 3A, in the order from an object side to an image side, the optical image capturing system 30 includes a first lens 310, a second lens 320, an aperture 300, a third lens 330, a fourth lens 340, an infrared filter 370, an image plane 380 and an image sensing device 390.

The first lens 310 has negative refractive power and is made of plastic. The object side 312 of the first lens 310 is a convex surface and the image side 314 of the first lens 310 is a concave surface, and the object side 312 and the image side 314 of the first lens 310 are both aspheric. The object side 312 and the image side 314 of the first lens 310 both have two inflection points.

The second lens 320 has positive refractive power and is made of plastic. The object side 322 of the second lens 320 is a convex surface and the image side 324 of the second lens 320 is a concave surface, and the object side 322 and the image side 324 of the second lens 320 are both aspheric. The object side 322 of the second lens 320 has one inflection point.

The third lens 330 has positive refractive power and is made of plastic. The object side 332 of the third lens 330 is a convex surface and the image side 334 of the third lens 330 is a convex surface, and the object side 332 and the image side 334 of the third lens 330 are both aspheric. The image side 334 of the third lens 330 has one inflection point.

The fourth lens 340 has negative refractive power and is made of plastic. The object side 342 of the fourth lens 340 is a convex surface and the image side 344 of the fourth lens 340 is a concave surface, and the object side 342 and the image side 344 of the fourth lens 340 are both aspheric. The object side 342 of the fourth lens 340 has one inflection point and the image side 344 of the fourth lens 340 has two inflection points.

The infrared filter 370 is made of glass and is disposed between the fourth lens 340 and the image plane 380. The infrared filter 370 does not affect the focal length of the optical image capturing system 30.

Table 5 and Table 6 below should be incorporated into the reference of the present embodiment.

TABLE 5

Lens Parameter for the Third Embodiment
f (focal length) = 0.8939 mm; f/HEP = 2.1;
HAF (half angle of view) = 60 deg

| Surface No. | | Curvature Radius | Thickness (mm) | Material |
|---|---|---|---|---|
| 0 | Object | 1E+18 | 5000 | |
| 1 | First Lens | 1.206401993 | 0.375 | Plastic |
| 2 | | 0.368999486 | 0.437 | |
| 3 | Second Lens | 0.936371159 | 0.693 | Plastic |
| 4 | | 1.428571429 | 0.211 | |
| 5 | Aperture | 1E+18 | −0.036 | |
| 6 | Third Lens | 1.481586598 | 0.943 | Plastic |
| 7 | | −0.400406139 | 0.030 | |
| 8 | Fourth Lens | −1.368234789 | 0.254 | Plastic |
| 9 | | 7.807468235 | 0.572 | |
| 10 | Infrared Filter | 1E+18 | 0.210 | BK7_SCHOTT |
| 11 | | 1E+18 | 0.300 | |
| 12 | Image Plane | 1E+18 | 0.000 | |

| Surface No. | Refractive Index | Coefficient of Dispersion | Focal Length |
|---|---|---|---|
| 0 | | | |
| 1 | 1.5445 | 55.9377 | −1.156 |
| 2 | | | |
| 3 | 1.66099 | 20.3809 | 2.607 |
| 4 | | | |
| 5 | | | |
| 6 | 1.5445 | 55.9377 | 0.701 |
| 7 | | | |
| 8 | 1.6355 | 23.8791 | −1.799 |
| 9 | | | |
| 10 | 1.517 | 64.13 | |
| 11 | | | |
| 12 | | | |

Reference Wavelength = 555 nm.

TABLE 6

The Aspheric Coefficients of the Third Embodiment
Table 6: Aspheric Coefficients

| Surface No. | 1 | 2 | 3 | 4 |
|---|---|---|---|---|
| k = | −6.231881E−01 | −1.000912E+00 | −5.165481E+00 | −1.398634E+00 |
| A4 = | −5.681048E−01 | −8.141914E−01 | 7.174913E−01 | 5.535078E−01 |
| A6 = | 5.793673E−01 | 9.646731E−01 | −3.383900E−01 | 3.111937E+01 |
| A8 = | −3.937815E−01 | −3.336046E+00 | −6.594012E+00 | −7.623298E+02 |
| A10 = | 1.694138E−01 | 1.334115E+01 | 4.308367E+01 | 1.175003E+04 |
| A12 = | −4.542427E−02 | −1.894799E+01 | −1.117920E+02 | −1.011456E+05 |
| A14 = | 6.857209E−03 | 6.847104E+00 | 1.410060E+02 | 4.625447E+05 |
| A16 = | −4.464738E−04 | 1.730733E+00 | −7.102501E+01 | −8.559139E+05 |

| Surface No. | 6 | 7 | 8 | 9 |
|---|---|---|---|---|
| k = | 1.300904E+00 | −1.035150E+00 | −2.198957E+01 | 8.471548E+01 |
| A4 = | 2.298968E−01 | 4.832137E+00 | 2.090172E+00 | −1.082184E+00 |
| A6 = | 8.485744E+00 | −4.894000E+01 | −3.114951E+01 | 3.670876E+00 |
| A8 = | −2.167700E+02 | 3.579941E+02 | 2.327621E+02 | −1.065687E+01 |
| A10 = | 4.237454E+03 | −1.734064E+03 | −1.083441E+03 | 2.096953E+01 |
| A12 = | −5.227448E+04 | 5.279304E+03 | 3.031924E+03 | −2.899994E+01 |
| A14 = | 3.496465E+05 | −9.210936E+03 | −4.722114E+03 | 2.303720E+01 |
| A16 = | −9.575574E+05 | 7.177904E+03 | 3.116313E+03 | −7.934777E+00 |

In the third embodiment, the form of the aspheric surface equation therein is presented as that in the first embodiment. Furthermore, the definition of parameters in the following tables is equivalent to that in the first embodiment, so that the repetitive details are not stated here.

The following values for the conditional expressions may be obtained from the data in Table 5 and Table 6.

| Third Embodiment (Primary reference wavelength = 555 nm) | | | | | |
|---|---|---|---|---|---|
| InRS41 | InRS42 | HVT41 | HVT42 | ODT % | TDT % |
| −0.18094 | −0.18898 | 0.00000 | 0.19019 | −5.51739 | 5.75103 |
| \| f/f1 \| | \| f/f2 \| | \| f/f3 \| | \| f/f4 \| | \| f1/f2 \| | \| f2/f3 \| |
| 0.77322 | 0.34286 | 1.27485 | 0.49693 | 0.44342 | 3.71831 |
| ΣPPR | ΣNPR | ΣPPR/\|ΣNPR\| | ΣPP | ΣNP | f1/ΣPP |
| 1.61771 | 1.27014 | 1.27364 | 3.30830 | −2.95486 | 0.78806 |
| f4/ΣNP | IN12/f | IN23/f | IN34/f | TP3/f | TP4/f |
| 0.39124 | 0.48931 | 0.19578 | 0.03356 | 1.05509 | 0.28469 |
| InTL | HOS | HOS/HOI | InS/HOS | InTL/HOS | ΣTP/InTL |
| 2.90810 | 3.99000 | 2.73299 | 0.56988 | 0.72885 | 0.77911 |
| (TP1 + IN12)/TP2 | (TP4 + IN34)/TP3 | TP1/TP2 | TP3/TP4 | IN23/(TP2 + IN23 + TP3) | |
| 1.17222 | 0.30164 | 0.54114 | 3.70607 | 0.09662 | |
| \|InRS41\|/TP4 | \|InRS42\|/TP4 | HVT42/HOI | HVT42/HOS | | |
| 0.7110 | 0.7426 | 0.1303 | 0.0477 | | |
| PLTA | PSTA | NLTA | NSTA | SLTA | SSTA |
| −0.006 mm | 0.009 mm | 0.017 mm | 0.015 mm | 0.003 mm | 0.010 mm |

The following values for the conditional expressions may be obtained from the data in Table 5 and Table 6.

| Values Related to Inflection Point of Third Embodiment (Primary Reference Wavelength = 555 nm) | | | |
|---|---|---|---|
| HIF111 | 0.5079 | HIF111/HOI | 0.3479 |
| HIF112 | 0.7290 | HIF112/HOI | 0.4994 |
| HIF121 | 0.7379 | HIF121/HOI | 0.5055 |
| HIF122 | 0.8834 | HIF122/HOI | 0.6051 |
| HIF211 | 0.7639 | HIF211/HOI | 0.5233 |
| HIF321 | 0.4916 | HIF321/HOI | 0.3367 |
| HIF411 | 0.6289 | HIF411/HOI | 0.4308 |
| HIF421 | 0.1053 | HIF421/HOI | 0.0721 |
| HIF422 | 0.8224 | HIF422/HOI | 0.5633 |
| SGI111 | 0.0793 | \|SGI111\|/(\|SGI111\| + TP1) | 0.1746 |
| SGI112 | 0.1297 | \|SGI112\|/(\|SGI112\| + TP1) | 0.2570 |
| SGI121 | 0.6136 | \|SGI121\|/(\|SGI121\| + TP1) | 0.6206 |
| SGI122 | 0.8080 | \|SGI122\|/(\|SGI122\| + TP1) | 0.6830 |
| SGI211 | 0.4194 | \|SGI211\|/(\|SGI211\| + TP2) | 0.3770 |
| SGI321 | −0.2230 | \|SGI321\|/(\|SGI321\| + TP3) | 0.1912 |
| SGI411 | −0.1544 | \|SGI411\|/(\|SGI411\| + TP4) | 0.3777 |
| SGI421 | 0.0006 | \|SGI421\|/(\|SGI421\| + TP4) | 0.0023 |
| SGI422 | −0.1825 | \|SGI422\|/(\|SGI422\| + TP4) | 0.4177 |

The values pertaining to the length of the outline curves are obtainable from the data in Table 5 and Table 6:

| Third Embodiment (Primary reference wavelength = 555 nm) | | | | | |
|---|---|---|---|---|---|
| ARE | 1/2(HEP) | ARE value | ARE − 1/2(HEP) | 2(ARE/HEP)% | TP | ARE/TP(%) |
| 11 | 0.213 | 0.213 | 0.00010 | 100.05% | 0.375 | 56.78% |
| 12 | 0.213 | 0.223 | 0.00966 | 104.54% | 0.375 | 59.33% |
| 21 | 0.213 | 0.214 | 0.00100 | 100.47% | 0.693 | 30.85% |
| 22 | 0.213 | 0.213 | 0.00024 | 100.11% | 0.693 | 30.74% |
| 31 | 0.213 | 0.213 | −0.00000 | 100.00% | 0.943 | 22.57% |
| 32 | 0.213 | 0.219 | 0.00634 | 102.98% | 0.943 | 23.24% |
| 41 | 0.213 | 0.212 | −0.00039 | 99.82% | 0.254 | 83.49% |
| 42 | 0.213 | 0.212 | −0.00084 | 99.61% | 0.254 | 83.31% |

| ARS | EHD | ARS value | ARS − EHD | (ARS/EHD)% | TP | ARS/TP(%) |
|---|---|---|---|---|---|---|
| 11 | 1.733 | 1.796 | 0.063 | 103.62% | 0.375 | 478.87% |
| 12 | 0.892 | 1.250 | 0.358 | 140.09% | 0.375 | 333.17% |
| 21 | 0.795 | 0.966 | 0.171 | 121.54% | 0.693 | 139.37% |
| 22 | 0.413 | 0.441 | 0.029 | 106.95% | 0.693 | 63.67% |
| 31 | 0.308 | 0.310 | 0.002 | 100.76% | 0.943 | 32.88% |
| 32 | 0.578 | 0.652 | 0.074 | 112.76% | 0.943 | 69.12% |
| 41 | 0.658 | 0.703 | 0.045 | 106.82% | 0.254 | 276.20% |
| 42 | 0.831 | 0.883 | 0.052 | 106.21% | 0.254 | 346.79% |

Fourth Embodiment

Figure 4A:
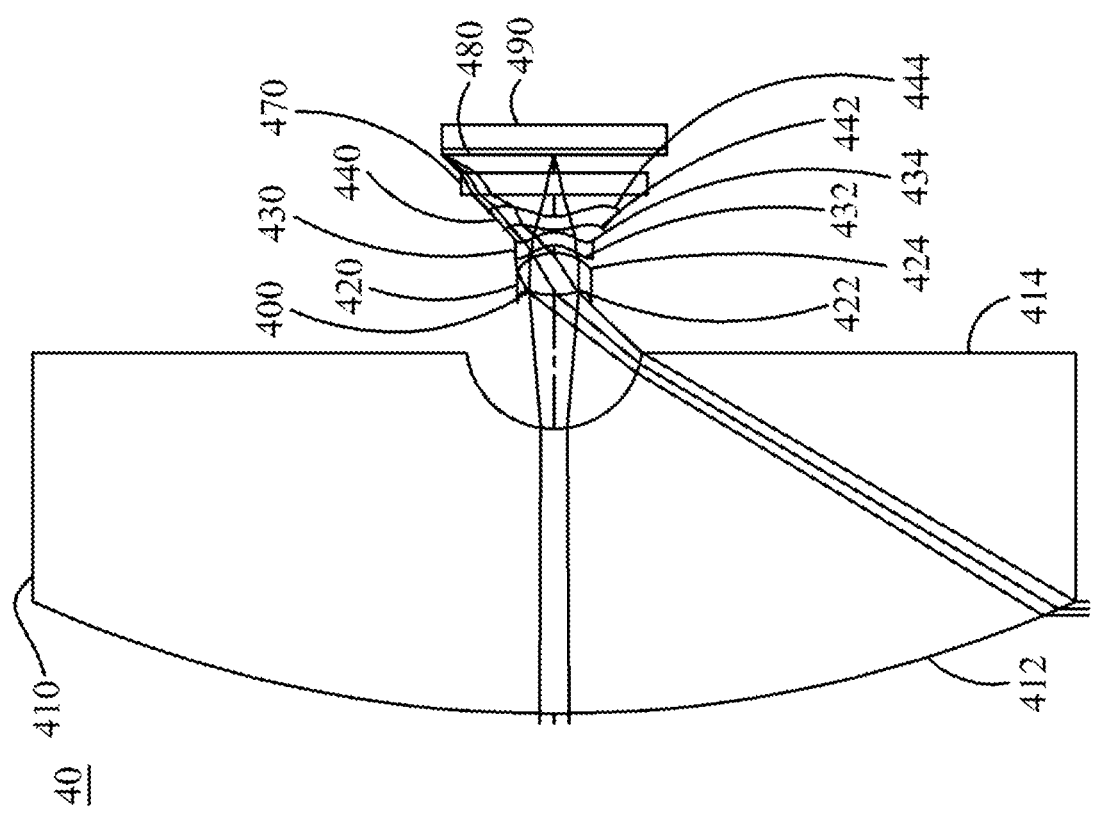
FIG. 4A is a schematic view of the optical image capturing system according to the fourth embodiment of the present invention.
Figure 4B:
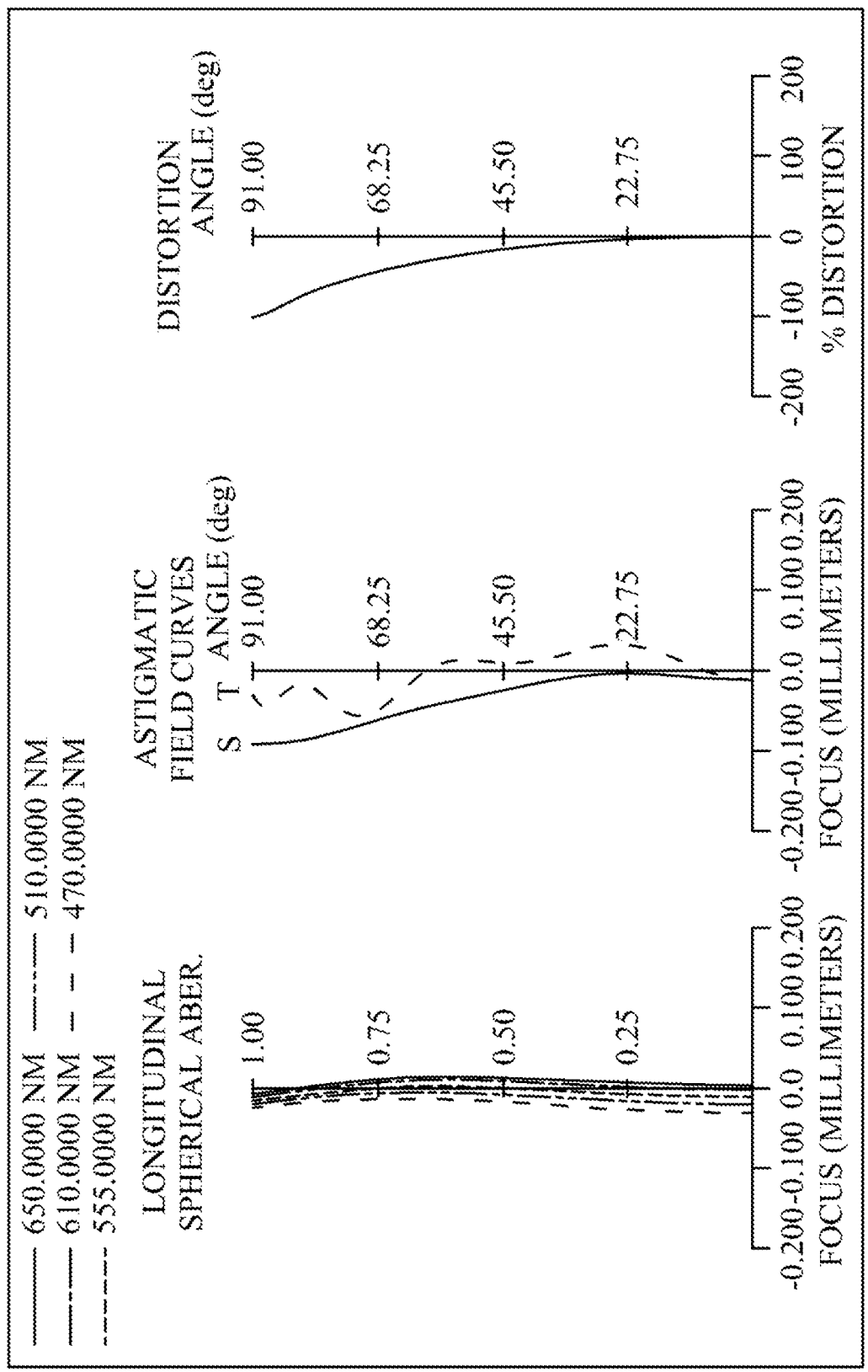
FIG. 4B a curve diagram illustrating the spherical aberration, astigmatism and optical distortion of the optical image capturing system in the sequence from left to right according to the fourth embodiment of the present invention.
Figure 4C:
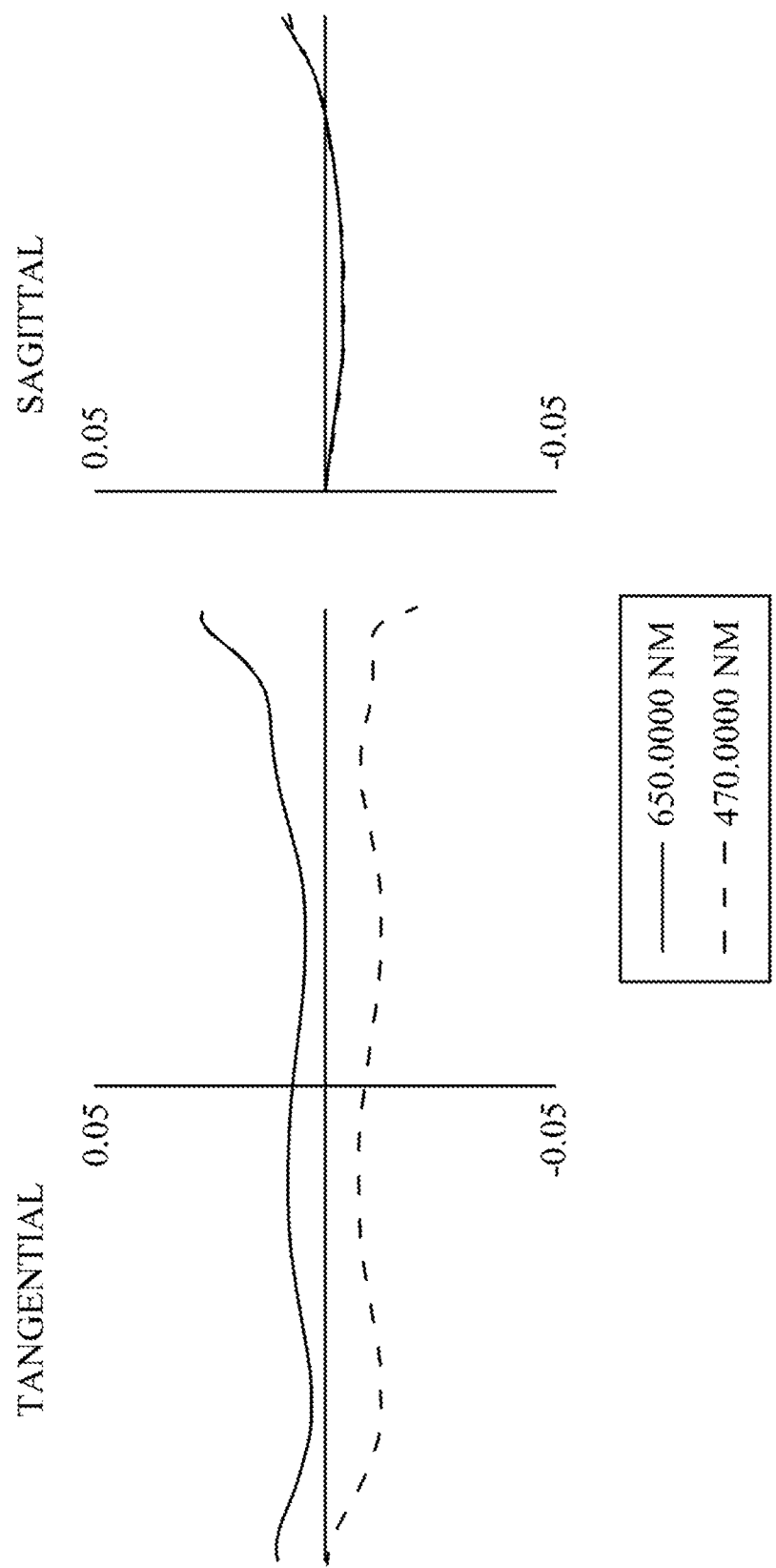
FIG. 4C shows the sagittal fan and the tangential fan of the optical image capturing system and the lateral aberration diagram of the longest operation wavelength and the shortest operation wavelength passing thorough the margin of the aperture at 0.7 field of view according to the fourth embodiment of the present invention.

Please refer to FIGS. 4A and 4B, wherein FIG. 4A is a schematic view of the optical image capturing system according to the fourth embodiment of the present invention. FIG. 4B is a curve diagram illustrating the spherical aberration, astigmatism and optical distortion of the optical image capturing system in the sequence from left to right according to the fourth embodiment of the present invention. FIG. 4C shows the sagittal fan and the tangential fan of the optical image capturing system and the lateral aberration diagram of the longest operation wavelength and the shortest operation wavelength passing thorough the margin of the aperture at 0.7 field of view according to the fourth embodiment of the present invention.

As shown in FIG. 4A, in the order from an object side to an image side, the optical image capturing system 40 includes a first lens 410, an aperture 400, a second lens 420, a third lens 430, a fourth lens 440, an infrared filter 470, an image plane 480 and an image sensing device 490.

The first lens 410 has negative refractive power and is made of glass. The object side 412 of the first lens 410 is a convex surface and the image side 414 of the first lens 410 is a concave surface, and the object side 412 and the image side 414 of the first lens 410 are both aspheric.

The second lens 420 has positive refractive power and is made of plastic. The object side 422 of the second lens 420 is a convex surface and the image side 424 of the second lens 420 is a convex surface, and the object side 422 and the image side 424 of the second lens 420 are both aspheric. The object side 422 of the second lens 420 has one inflection point.

The third lens 430 has positive refractive power and is made of plastic. The object side 432 of the third lens 430 is a concave surface and the image side 434 of the third lens 430 is a convex surface, and the object side 432 and the image side 434 of the third lens 430 are both aspheric. The object side 432 and image side 434 of the third lens 430 both have one inflection point.

The fourth lens 440 has negative refractive power and is made of plastic. The object side 442 of the fourth lens 440 is a convex surface and the image side 444 of the fourth lens 440 is a concave surface, and the object side 442 and the image side 444 of the fourth lens 440 are both aspheric. The object side 442 and image side 444 of the fourth lens 440 both have one inflection point.

The infrared filter 470 is made of glass and is disposed between the fourth lens 440 and the image plane 480. The infrared filter 470 does not affect the focal length of the optical image capturing system.

Table 7 and Table 8 below should be incorporated into the reference of the present embodiment.

TABLE 7

Fourth Embodiment for the Fourth Embodiment
f (focal length) = 1.1951 mm; f/HEP = 1.8;
HAF (half angle of view) = 89.9497 deg;

| Surface No. | | Curvature Radius | Thickness (mm) | Material |
|---|---|---|---|---|
| 0 | Object | 1E+18 | 1E+13 | |
| 1 | First Lens | 28.42815345 | 6.528 | Glass |
| 2 | | 2.006013107 | 3.118 | |
| 3 | Aperture | 1E+18 | −0.045 | |
| 4 | Second Lens | 1.691021363 | 0.955 | Plastic |
| 5 | | −1.216537682 | 0.174 | |
| 6 | Third Lens | −0.639093149 | 0.300 | Plastic |
| 7 | | −0.75320371 | 0.050 | |
| 8 | Fourth Lens | 1.3910909 | 0.313 | Plastic |
| 9 | | 1.076615675 | 0.500 | |

TABLE 7-continued

Fourth Embodiment for the Fourth Embodiment
f (focal length) = 1.1951 mm; f/HEP = 1.8;
HAF (half angle of view) = 89.9497 deg;

| | | | | |
|---|---|---|---|---|
| 10 | Infrared Filter | 1E+18 | 0.500 | BK7_SCHOTT |
| 11 | | 1E+18 | 0.406 | |
| 12 | Image Plane | 1E+18 | 0.011 | |

| Surface No. | Refractive Index | Coefficient of Dispersion | Focal Length |
|---|---|---|---|
| 0 | | | |
| 1 | 1.569 | 56.04 | −4.155 |
| 2 | | | |
| 3 | | | |
| 4 | 1.565 | 58.00 | 1.417 |
| 5 | | | |
| 6 | 1.661 | 20.40 | 121.688 |
| 7 | | | |
| 8 | 1.661 | 20.40 | −11.871 |
| 9 | | | |
| 10 | 1.517 | 64.13 | |
| 11 | | | |
| 12 | | | |

Reference Wavelength = 555 nm.

TABLE 8

The Aspheric Coefficients of the Fourth Embodiment
Table 8: Aspheric Coefficients

| Surface No. | 1 | 2 | 4 | 5 |
|---|---|---|---|---|
| k = | 0.000000E+00 | 0.000000E+00 | −1.038735E+01 | 6.790634E−01 |
| A4 = | 0.000000E+00 | 0.000000E+00 | 1.263757E−01 | −2.204672E−01 |
| A6 = | 0.000000E+00 | 0.000000E+00 | −5.503593E−01 | 5.590367E−01 |
| A8 = | 0.000000E+00 | 0.000000E+00 | 9.216810E−01 | −4.532860E−01 |
| A10 = | 0.000000E+00 | 0.000000E+00 | −2.242420E+00 | 5.646939E−02 |
| A12 = | 0.000000E+00 | 0.000000E+00 | 0.000000E+00 | 0.000000E+00 |

| Surface No. | 6 | 7 | 8 | 9 |
|---|---|---|---|---|
| k = | −6.692118E−01 | −1.953179E+00 | −1.028572E+00 | −3.293879E+00 |
| A4 = | 2.174400E−01 | 4.917091E−02 | −1.988121E−01 | −1.216932E−01 |
| A6 = | 1.690734E+00 | 4.910423E−01 | −1.610120E−01 | 3.247207E−03 |
| A8 = | −1.958822E+00 | −1.592475E−01 | 1.783118E−01 | 1.304421E−02 |
| A10 = | 8.915659E−01 | 7.386421E−02 | −8.365086E−02 | −4.527093E−03 |
| A12 = | 0.000000E+00 | 0.000000E+00 | 0.000000E+00 | 0.000000E+00 |

In the fourth embodiment, the form of the aspheric surface equation therein is presented as that in the first embodiment. Furthermore, the definition of parameters in the following tables is equivalent to that in the first embodiment, so that the repetitive details are not stated here.

The following values for the conditional expressions may be obtained from the data in Table 7 and Table 8.

| Fourth Embodiment (Primary reference wavelength = 555 nm) | | | | | |
|---|---|---|---|---|---|
| InRS41 | InRS42 | HVT41 | HVT42 | ODT % | TDT % |
| 0.08593 | 0.21194 | 0.82334 | 1.13171 | −100.18300 | 66.23470 |
| \| f/f1 \| | \| f/f2 \| | \| f/f3 \| | \| f/f4 \| | \| f1/f2 \| | \| f2/f3 \| |
| 0.28764 | 0.84357 | 0.00982 | 0.10068 | 2.93278 | 0.01164 |
| ΣPPR | ΣNPR | ΣPPR/\|ΣNPR\| | ΣPP | ΣNP | f1/ΣPP |
| 0.85339 | 0.38831 | 2.19769 | 123.10474 | −16.02568 | 0.01151 |
| f4/ΣNP | IN12/f | IN23/f | IN34/f | TP3/f | TP4/f |
| 0.25927 | 2.57156 | 0.14571 | 0.04188 | 0.25108 | 0.26200 |
| InTL | HOS | HOS/HOI | InS/HOS | InTL/HOS | ΣTP/InTL |
| 11.39440 | 12.81140 | 5.12456 | 0.24707 | 0.88940 | 0.71060 |
| (TP1 + IN12)/TP2 | (TP4 + IN34)/TP3 | TP1/TP2 | TP3/TP4 | IN23/(TP2 + IN23 + TP3) | |
| 10.04959 | 1.21030 | 6.83286 | 0.95831 | 0.12180 | |

-continued

| Fourth Embodiment (Primary reference wavelength = 555 nm) | | | | | |
|---|---|---|---|---|---|
| \|InRS41\|/TP4 | \|InRS42\|/TP4 | HVT42/HOI | HVT42/HOS | | |
| 0.2744 | 0.6769 | 0.4527 | 0.0883 | | |
| PLTA | PSTA | NLTA | NSTA | SLTA | SSTA |
| −0.021 mm | 0.029 mm | −0.00038 mm | 0.011 mm | 0.009 mm | 0.010 mm |

The following values for the conditional expressions may be obtained from the data in Table 7 and Table 8.

| Values Related to Inflection Point of fourth Embodiment (Primary Reference Wavelength = 555 nm) | | | |
|---|---|---|---|
| HIF211 | 0.4490 | HIF211/HOI | 0.1796 |
| HIF311 | 0.4749 | HIF311/HOI | 0.1900 |
| HIF321 | 0.4780 | HIF321/HOI | 0.1912 |
| HIF411 | 0.4830 | HIF411/HOI | 0.1932 |
| HIF421 | 0.5689 | HIF421/HOI | 0.2276 |
| SGI211 | 0.0535 | \|SGI211\|/(\|SGI211\|+TP2) | 0.0530 |
| SGI311 | −0.1594 | \|SGI311\|/(\|SGI311\|+TP3) | 0.3470 |
| SGI321 | −0.1314 | \|SGI321\|/(\|SGI321\|+TP3) | 0.3045 |
| SGI411 | 0.0714 | \|SGI411\|/(\|SGI411\|+TP4) | 0.1857 |
| SGI421 | 0.1193 | \|SGI421\|/(\|SGI421\|+TP4) | 0.2759 |

The values pertaining to the length of the outline curves are obtainable from the data in Table 7 and Table 8:

| Fourth Embodiment (Primary reference wavelength = 555 nm) | | | | | | |
|---|---|---|---|---|---|---|
| ARE | 1/2(HEP) | ARE value | ARE − 1/2(HEP) | 2(ARE/HEP)% | TP | ARE/TP(%) |
| 11 | 0.332 | 0.331 | −0.00097 | 99.71% | 6.528 | 5.07% |
| 12 | 0.332 | 0.333 | 0.00054 | 100.16% | 6.528 | 5.09% |
| 21 | 0.332 | 0.333 | 0.00088 | 100.27% | 0.955 | 34.84% |
| 22 | 0.332 | 0.336 | 0.00383 | 101.15% | 0.955 | 35.15% |
| 31 | 0.332 | 0.344 | 0.01228 | 103.70% | 0.300 | 114.72% |
| 32 | 0.332 | 0.340 | 0.00802 | 102.42% | 0.300 | 113.31% |
| 41 | 0.332 | 0.334 | 0.00166 | 100.50% | 0.313 | 106.55% |
| 42 | 0.332 | 0.335 | 0.00328 | 100.99% | 0.313 | 107.07% |
| ARS | EHD | ARS value | ARS − EHD | (ARS/EHD)% | TP | ARS/TP(%) |
| 11 | 11.818 | 12.188 | 0.370 | 103.13% | 6.528 | 186.70% |
| 12 | 1.987 | 2.867 | 0.881 | 144.32% | 6.528 | 43.92% |
| 21 | 0.602 | 0.608 | 0.006 | 100.99% | 0.955 | 63.66% |
| 22 | 0.846 | 0.986 | 0.141 | 116.62% | 0.955 | 103.25% |
| 31 | 0.877 | 0.938 | 0.060 | 106.88% | 0.300 | 312.46% |
| 32 | 0.886 | 0.930 | 0.044 | 105.01% | 0.300 | 309.98% |
| 41 | 1.100 | 1.139 | 0.039 | 103.55% | 0.313 | 363.60% |
| 42 | 1.484 | 1.536 | 0.052 | 103.51% | 0.313 | 490.43% |

Fifth Embodiment

Figure 5A:
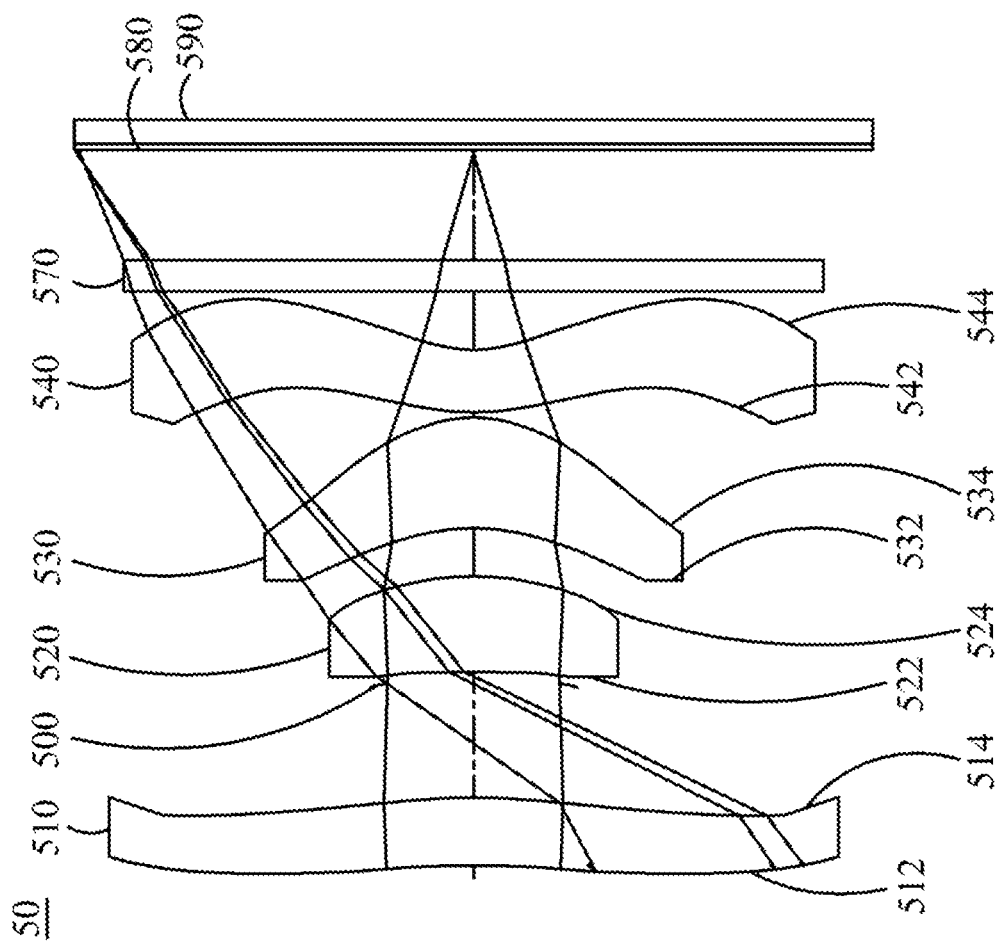
FIG. 5A is a schematic view of the optical image capturing system according to the fifth embodiment of the present invention.
Figure 5B:
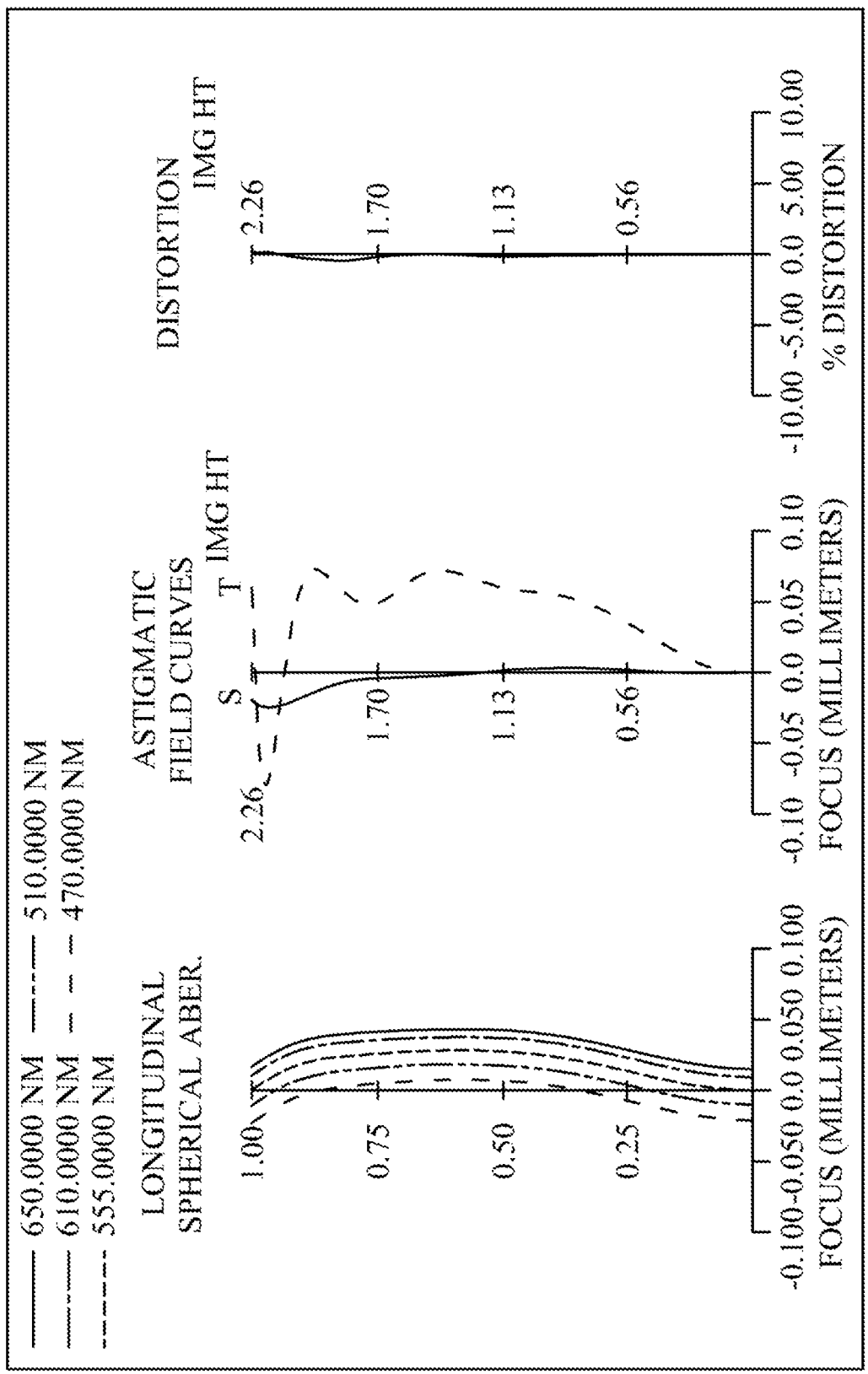
FIG. 5B a curve diagram illustrating the spherical aberration, astigmatism and optical distortion of the optical image capturing system in the sequence from left to right according to the fifth embodiment of the present invention.
Figure 5C:
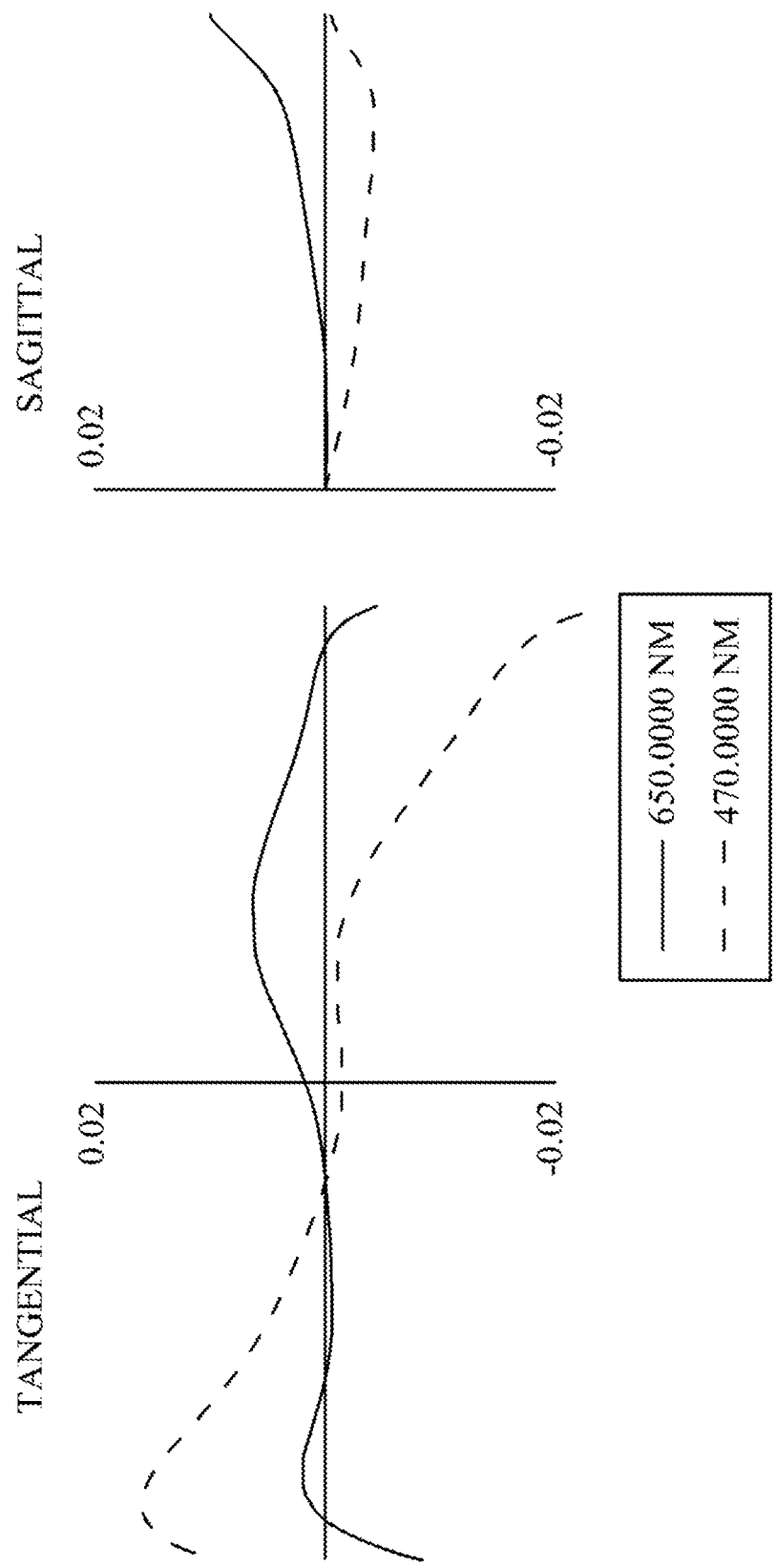
FIG. 5C shows the sagittal fan and the tangential fan of the optical image capturing system and the lateral aberration diagram of the longest operation wavelength and the shortest operation wavelength passing thorough the margin of the aperture at 0.7 field of view according to the fifth embodiment of the present invention.

Please refer to FIGS. 5A and 5B, wherein FIG. 5A is a schematic view of the optical image capturing system according to the fifth embodiment of the present invention. FIG. 5B is a curve diagram illustrating the spherical aberration, astigmatism and optical distortion of the optical image capturing system in the sequence from left to right according to the fifth embodiment of the present invention. FIG. 5C shows the sagittal fan and the tangential fan of the optical image capturing system and the lateral aberration diagram of the longest operation wavelength and the shortest operation wavelength passing thorough the margin of the aperture at 0.7 field of view according to the fifth embodiment of the present invention.

As shown in FIG. 5A, in the order from an object side to an image side, the optical image capturing system 50 includes a first lens 510, an aperture 500, a second lens 520, a third lens 530, a fourth lens 540, an infrared filter 570, an image plane 580 and an image sensing device 590.

The first lens 510 has positive refractive power and is made of plastic. The object side 512 of the first lens 510 is a concave surface and the image side 514 of the first lens 510 is a convex surface, and the object side 512 and the image side 514 of the first lens 510 are both aspheric. The object side 512 and the image side 514 of the first lens 510 both have one inflection point.

The second lens 520 has positive refractive power and is made of plastic. The object side 522 of the second lens 520 is a concave surface and the image side 524 of the second lens 520 is a convex surface, and the object side 522 and the image side 524 of the second lens 520 are both aspheric. The image side 524 of the second lens 520 has one inflection point.

The third lens 530 has positive refractive power and is made of plastic. The object side 532 of the third lens 530 is a concave surface and the image side 534 of the third lens 530 is a convex surface, and the object side 532 and the image side 534 of the third lens 530 are both aspheric. The image side 534 of the third lens 530 has two inflection points.

The fourth lens 540 has negative refractive power and is made of plastic. The object side 542 of the fourth lens 540 is a convex surface and the image side 544 of the fourth lens 540 is a concave surface, and the object side 542 and the image side 544 of the fourth lens 540 are both aspheric. The object side 542 and the image side 544 of the fourth lens 540 both have one inflection point.

The infrared filter 570 is made of glass and is disposed between the fourth lens 540 and the image plane 580. The infrared filter 570 does not affect the focal length of the optical image capturing system 50.

Table 9 and Table 10 below should be incorporated into the reference of the present embodiment.

TABLE 9

| Lens Parameter for the Fifth Embodiment f (focal length) = 1.9206 mm; f/HEP = 2.0; HAF (half angle of view) = 49.5 deg; | | | | |
|---|---|---|---|---|
| Surface No. | | Curvature Radius | Thickness (mm) | Material |
| 0 | Object | 1E+18 | 1E+18 | |
| 1 | First Lens | −6.105334352 | 0.498 | Plastic |
| 2 | | −3.767861439 | 0.698 | |
| 3 | Aperture | 1E+18 | 0.175 | Plastic |
| 4 | Second Lens | −5.746865306 | 0.547 | |
| 5 | | −1.385639072 | 0.367 | |
| 6 | Third Lens | −1.099100114 | 0.723 | Plastic |
| 7 | | −0.694736745 | 0.050 | |
| 8 | Fourth Lens | 1.64403896 | 0.485 | Plastic |
| 9 | | 0.753855258 | 0.313 | |
| 10 | Infrared Filter | 1E+18 | 0.210 | BK_7 |

TABLE 9-continued

Lens Parameter for the Fifth Embodiment
f (focal length) = 1.9206 mm; f/HEP = 2.0;
HAF (half angle of view) = 49.5 deg;

| | | | |
|---|---|---|---|
| 11 | | 1E+18 | 0.740 |
| 12 | Image Plane | 1E+18 | 0.000 |

| Surface No. | Refractive Index | Coefficient of Dispersion | Focal Length |
|---|---|---|---|
| 0 | | | |
| 1 | 1.636 | 23.879 | 13.258 |
| 2 | | | |
| 3 | | | |
| 4 | 1.545 | 55.938 | 3.084 |
| 5 | | | |
| 6 | 1.545 | 55.938 | 1.909 |
| 7 | | | |
| 8 | 1.661 | 20.391 | −2.642 |
| 9 | | | |
| 10 | 1.517 | 64.13 | |
| 11 | | | |
| 12 | | | |

Reference Wavelength = 555 nm. Shield Position: the 1st surface with effective aperture radius = 1.988 mm; the 2nd surface with effective aperture radius = 1.795 mm; the 4th surface with effective aperture radius = 0.746 mm; the 6th surface with effective aperture radius = 1.237 mm; the 8th surface with effective aperture radius = 2.002 mm.

TABLE 10

The Aspheric Coefficients of the Fifth Embodiment
Table 10: Aspheric Coefficients

| Surface No. | 1 | 2 | 4 | 5 |
|---|---|---|---|---|
| k = | −4.212991E+01 | −3.134102E+01 | 3.679565E+01 | 1.167325E−01 |
| A4 = | 5.214611E−02 | 4.365440E−02 | −1.773393E−01 | 1.029283E−01 |
| A6 = | −2.806010E−02 | −3.101334E−02 | 7.409427E−01 | −1.214077E+00 |
| A8 = | 1.212574E−02 | 1.610257E−02 | −7.707940E+00 | 8.541450E+00 |
| A10 = | −3.731120E−03 | −5.843953E−03 | 4.196491E+01 | −3.455472E+01 |
| A12 = | 6.872495E−04 | 1.320514E−03 | −1.357810E+02 | 7.758153E+01 |
| A14 = | −5.249566E−05 | −1.279847E−04 | 1.783585E+02 | −9.204209E+01 |
| A16 = | 0.000000E+00 | 0.000000E+00 | 0.000000E+00 | 4.406861E+01 |

| Surface No. | 6 | 7 | 8 | 9 |
|---|---|---|---|---|
| k = | −1.233947E−01 | −2.658046E+00 | −9.479655E−01 | −4.668038E+00 |
| A4 = | 4.451173E−01 | −1.900094E−01 | −3.678069E−01 | −1.072075E−01 |
| A6 = | −1.276507E+00 | −1.899034E−01 | 1.798565E−01 | 1.425226E−02 |
| A8 = | 4.302273E+00 | 6.331570E−01 | −3.546899E−02 | 3.233950E−02 |
| A10 = | −8.099847E+00 | −7.864107E−01 | −4.382862E−02 | −3.529523E−02 |
| A12 = | 9.497774E+00 | 5.856213E−01 | 3.491402E−02 | 1.526470E−02 |
| A14 = | −6.389137E+00 | −1.774270E−01 | −9.280103E−03 | −3.091811E−03 |
| A16 = | 1.842006E+00 | 0.000000E+00 | 8.355462E−04 | 2.426401E−04 |

In the fifth embodiment, the form of the aspheric surface equation therein is presented as that in the first embodiment. Furthermore, the definition of parameters in the following tables is equivalent to that in the first embodiment, so that the repetitive details are not stated here.

The following values for the conditional expressions may be obtained from the data in Table 9 and Table 10.

| Fifth Embodiment (Primary reference wavelength = 555 nm) | | | | | |
|---|---|---|---|---|---|
| InRS41 | InRS42 | HVT41 | HVT42 | ODT % | TDT % |
| −0.01732 | 0.10074 | 0.97638 | 1.23713 | −0.46618 | 0.65912 |
| \| f/f1 \| | \| f/f2 \| | \| f/f3 \| | \| f/f4 \| | \| f1/f2 \| | \| f2/f3 \| |
| 0.14487 | 0.62270 | 1.00623 | 0.72707 | 4.29845 | 1.61591 |
| ΣPPR | ΣNPR | ΣPPR/\|ΣNPR\| | ΣPP | ΣNP | f1/ΣPP |
| 1.34977 | 1.15110 | 1.17260 | 0.44274 | 15.16641 | −5.96639 |
| f4/ΣNP | IN12/f | IN23/f | IN34/f | TP3/f | TP4/f |
| 0.87415 | 0.40931 | 0.15660 | 0.01784 | 0.36030 | 0.20274 |
| InTL | HOS | HOS/HOI | InS/HOS | InTL/HOS | ΣTP/InTL |
| 3.22188 | 4.47041 | 1.97456 | 0.74659 | 0.72071 | 0.65202 |
| (TP1 + IN12)/TP2 | (TP4 + IN34)/TP3 | TP1/TP2 | TP3/TP4 | IN23/(TP2 + IN23 + TP3) | |
| 2.03387 | 0.61222 | 0.71289 | 1.77713 | 0.18942 | |
| \| InRS41 \|/TP4 | \| InRS42 \|/TP4 | HVT42/HOI | HVT42/HOS | | |
| 0.0445 | 0.2587 | 0.5464 | 0.2767 | | |
| PLTA | PSTA | NLTA | NSTA | SLTA | SSTA |
| −0.022 mm | −0.004 mm | 0.011 mm | −0.008 mm | −0.001 mm | 0.010 mm |

The following values for the conditional expressions may be obtained from the data in Table 9 and Table 10.

Values Related to Inflection Point of fifth Embodiment
(Primary Reference Wavelength = 555 nm)

| | | | |
|---|---|---|---|
| HIF111 | 0.5110 | HIF111/HOI | 0.2257 |
| HIF121 | 0.5929 | HIF121/HOI | 0.2619 |
| HIF221 | 0.7922 | HIF221/HOI | 0.3499 |
| HIF321 | 0.8609 | HIF321/HOI | 0.3803 |
| HIF322 | 1.0859 | HIF322/HOI | 0.4796 |
| HIF411 | 0.4895 | HIF411/HOI | 0.2162 |
| HIF421 | 0.4987 | HIF421/HOI | 0.2203 |
| SGI111 | −0.0244 | \| SGI111 \|/(\| SGI111 \| + TP1) | 0.0544 |
| SGI121 | −0.0440 | \| SGI121 \|/(\| SGI121 \| + TP1) | 0.0939 |
| SGI221 | −0.2654 | \| SGI221 \|/(\| SGI221 \| + TP2) | 0.3084 |
| SGI321 | −0.4773 | \| SGI321 \|/(\| SGI321 \| + TP3) | 0.4082 |
| SGI322 | −0.6739 | \| SGI322 \|/(\| SGI322 \| + TP3) | 0.4934 |
| SGI411 | 0.0743 | \| SGI411 \|/(\| SGI411 \| + TP4) | 0.1603 |
| SGI421 | 0.1309 | \| SGI421 \|/(\| SGI421 \| + TP4) | 0.2516 |

The values pertaining to the length of the outline curves are obtainable from the data in Table 9 and Table 10:

Fifth Embodiment (Primary reference wavelength = 555 nm)

| ARE | 1/2(HEP) | ARE value | ARE − 1/2(HEP) | 2(ARE/HEP)% | TP | ARE/TP(%) |
|---|---|---|---|---|---|---|
| 11 | 0.480 | 0.481 | 0.00048 | 100.10% | 0.424 | 113.29% |
| 12 | 0.480 | 0.481 | 0.00114 | 100.24% | 0.424 | 113.45% |
| 21 | 0.480 | 0.481 | 0.00071 | 100.15% | 0.595 | 80.80% |
| 22 | 0.480 | 0.489 | 0.00890 | 101.85% | 0.595 | 82.18% |
| 31 | 0.480 | 0.494 | 0.01365 | 102.84% | 0.692 | 71.36% |
| 32 | 0.480 | 0.513 | 0.03306 | 106.89% | 0.692 | 74.17% |
| 41 | 0.480 | 0.487 | 0.00645 | 101.34% | 0.389 | 124.97% |
| 42 | 0.480 | 0.499 | 0.01842 | 103.84% | 0.389 | 128.04% |

| ARS | EHD | ARS value | ARS − EHD | (ARS/EHD)% | TP | ARS/TP(%) |
|---|---|---|---|---|---|---|
| 11 | 2.010 | 2.022 | 0.011 | 100.57% | 0.424 | 476.54% |
| 12 | 1.618 | 1.622 | 0.004 | 100.27% | 0.424 | 382.34% |
| 21 | 0.528 | 0.529 | 0.001 | 100.11% | 0.595 | 88.81% |
| 22 | 0.794 | 0.856 | 0.063 | 107.89% | 0.595 | 143.88% |
| 31 | 0.949 | 1.016 | 0.067 | 107.08% | 0.692 | 146.79% |
| 32 | 1.151 | 1.390 | 0.239 | 120.79% | 0.692 | 200.89% |
| 41 | 1.561 | 1.605 | 0.044 | 102.80% | 0.389 | 412.20% |
| 42 | 1.880 | 1.995 | 0.115 | 106.10% | 0.389 | 512.29% |

Sixth Embodiment

Figure 6A:
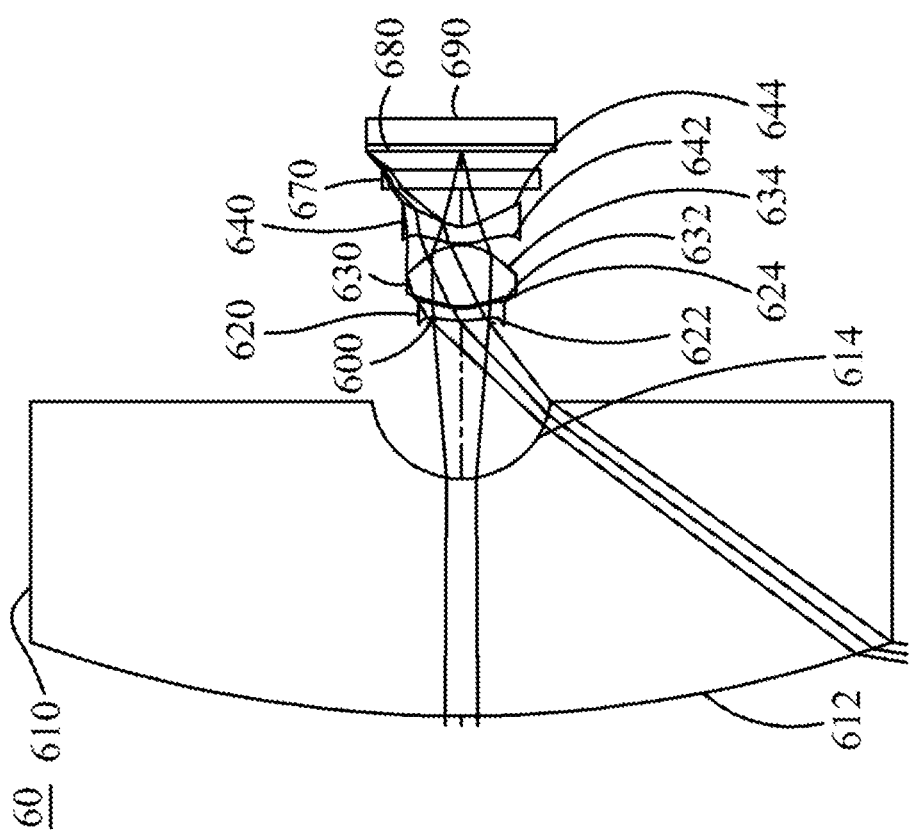
FIG. 6A is a schematic view of the optical image capturing system according to the sixth embodiment of the present invention.
Figure 6B:
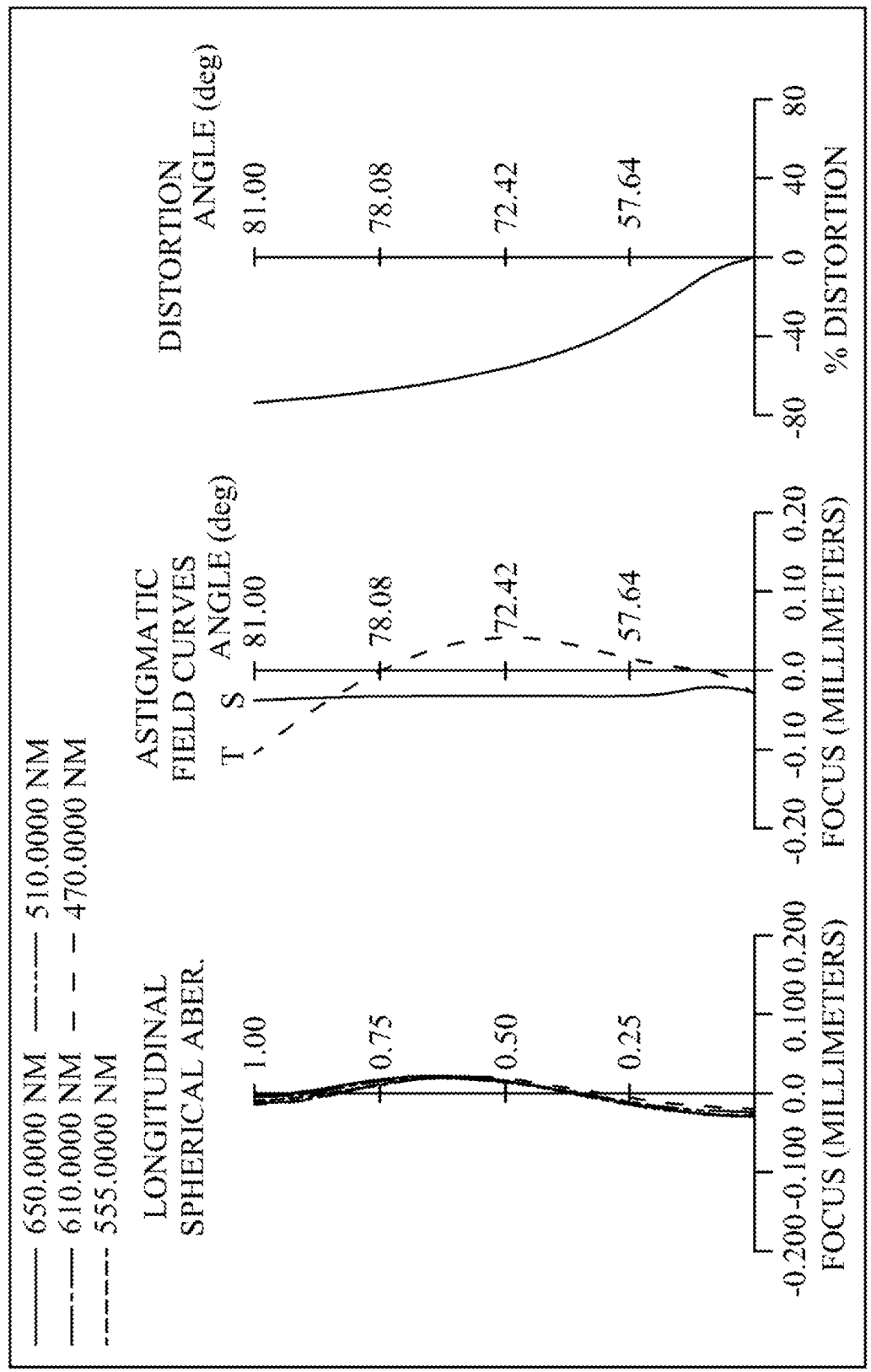
FIG. 6B a curve diagram illustrating the spherical aberration, astigmatism and optical distortion of the optical image capturing system in the sequence from left to right according to the sixth embodiment of the present invention.
Figure 6C:
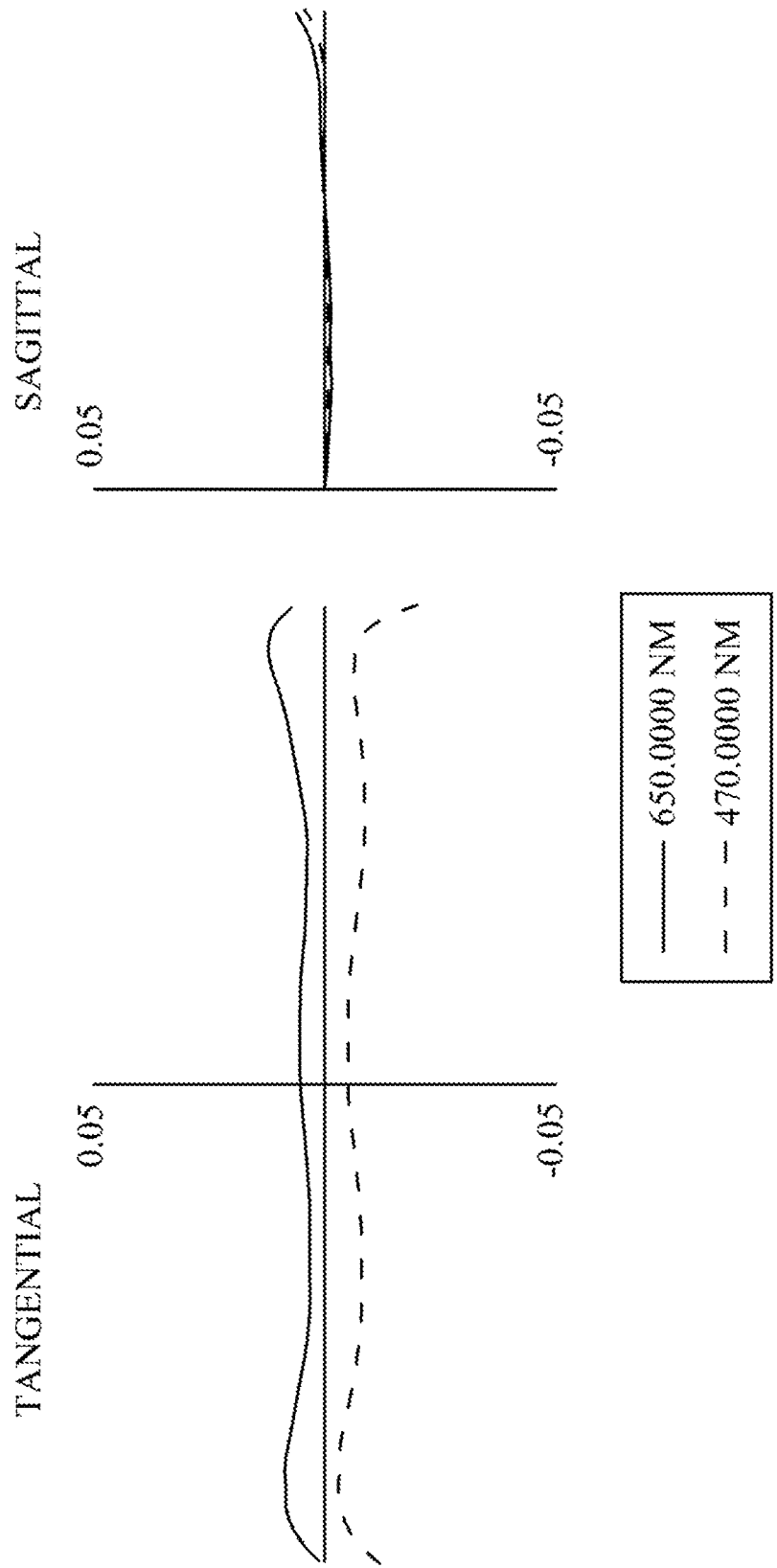
FIG. 6C shows the sagittal fan and the tangential fan of the optical image capturing system and the lateral aberration diagram of the longest operation wavelength and the shortest operation wavelength passing thorough the margin of the aperture at 0.7 field of view according to the sixth embodiment of the present invention.

Please refer to FIGS. 6A and 6B, wherein FIG. 6A is a schematic view of the optical image capturing system according to the sixth embodiment of the present invention. FIG. 6B is a curve diagram illustrating the spherical aberration, astigmatism and optical distortion of the optical image capturing system in the sequence from left to right according to the sixth embodiment of the present invention. FIG. 6C shows the sagittal fan and the tangential fan of the optical image capturing system and the lateral aberration diagram of the longest operation wavelength and the shortest operation wavelength passing thorough the margin of the aperture at 0.7 field of view according to the sixth embodiment of the present invention.

As shown in FIG. 6A, in the order from an object side to an image side, the optical image capturing system 60 includes a first lens 610, an aperture 600, a second lens 620, a third lens 630, a fourth lens 640, an infrared filter 670, an image plane 680 and an image sensing device 690.

The first lens 610 has negative refractive power and is made of glass. The object side 612 of the first lens 610 is a convex surface and the image side 614 of the first lens 610 is a concave surface, and the object side 612 and the image side 614 of the first lens 610 are both aspheric.

The second lens 620 has negative refractive power and is made of plastic. The object side 622 of the second lens 620 is a convex surface and the image side 624 of the second lens 620 is a concave surface, and the object side 622 and the image side 624 of the second lens 620 are both aspheric. The object side 622 and the image side 624 of the second lens 620 both have one inflection point.

The third lens 630 has positive refractive power and is made of plastic. The object side 632 of the third lens 630 is a convex surface and the image side 634 of the third lens 630 is a convex surface, and the object side 632 and the image side 634 of the third lens 630 are both aspheric. The image side 634 of the third lens 630 has one inflection point.

The fourth lens 640 has negative refractive power and is made of plastic. The object side 642 of the fourth lens 640 is a convex surface and the image side 644 of the fourth lens 640 is a concave surface, and the object side 642 and the image side 644 of the fourth lens 640 are both aspheric. The image side 644 and the object side 642 of the fourth lens 640 both have one inflection point.

The infrared filter 670 is made of glass and is disposed between the fourth lens 640 and the image plane 680. The infrared filter 670 does not affect the focal length of the optical image capturing system 60.

Table 11 and Table 12 below should be incorporated into the reference of the present embodiment.

TABLE 11

Lens Parameter for the Sixth Embodiment
f (focal length) = 1.5293 mm; f/HEP = 1.8;
HAF (half angle of view) = 80.0002 deg

| Surface No. | | Curvature Radius | Thickness (mm) | Material |
|---|---|---|---|---|
| 0 | Object | 1E+18 | 1E+13 | |
| 1 | First Lens | 33.96670836 | 6.367 | Glass |
| 2 | | 2.384801492 | 4.168 | |
| 3 | Aperture | 1E+18 | 0.076 | |
| 4 | Second Lens | 2.437806097 | 0.328 | Plastic |
| 5 | | 1.406697788 | 0.050 | |
| 6 | Third Lens | 1.663286528 | 1.646 | Plastic |
| 7 | | −1.105852275 | 0.050 | |
| 8 | Fourth Lens | 1.86776692 | 0.457 | Plastic |
| 9 | | 0.962062686 | 1.000 | |
| 10 | Infrared Filter | 1E+18 | 0.500 | BK_7 |
| 11 | | 1E+18 | 0.475 | |
| 12 | Image Plane | 1E+18 | 0.029 | |

| Surface No. | Refractive Index | Coefficient of Dispersion | Focal Length |
|---|---|---|---|
| 0 | | | |
| 1 | 1.517 | 64.20 | −5.315 |
| 2 | | | |
| 3 | | | |
| 4 | 1.661 | 20.40 | −5.714 |
| 5 | | | |
| 6 | 1.565 | 58.00 | 1.493 |
| 7 | | | |
| 8 | 1.661 | 20.40 | −3.729 |
| 9 | | | |
| 10 | 1.517 | 64.13 | 1E+18 |
| 11 | | | |
| 12 | | | |

Reference Wavelength = 555 nm

TABLE 12

The Aspheric Coefficients of the Sixth Embodiment
Table 12: Aspheric Coefficients

| Surface No. | 1 | 2 | 4 | 5 |
|---|---|---|---|---|
| k = | 0.000000E+00 | 0.000000E+00 | −8.107424E+00 | −5.480770E+00 |
| A4 = | 0.000000E+00 | 0.000000E+00 | −1.013680E−01 | −1.151007E−01 |
| A6 = | 0.000000E+00 | 0.000000E+00 | 3.249061E−02 | 8.615677E−02 |
| A8 = | 0.000000E+00 | 0.000000E+00 | −1.772131E−03 | −5.622317E−02 |
| A10 = | 0.000000E+00 | 0.000000E+00 | −6.173641E−02 | 5.188087E−03 |
| A12 = | 0.000000E+00 | 0.000000E+00 | 0.000000E+00 | 0.000000E+00 |

| Surface No. | 6 | 7 | 8 | 9 |
|---|---|---|---|---|
| k = | −6.602523E+00 | −4.587583E+00 | −4.838229E+00 | −4.146994E+00 |
| A4 = | −4.167732E−02 | −1.378650E−01 | −2.442303E−02 | 3.739745E−02 |
| A6 = | 3.884562E−02 | 7.494643E−02 | −9.757068E−03 | −3.904472E−02 |
| A8 = | −2.013306E−02 | −3.735459E−02 | −2.541660E−03 | 1.347993E−02 |
| A10 = | 4.567148E−03 | 8.758062E−03 | 3.780369E−04 | −1.642790E−03 |
| A12 = | 0.000000E+00 | 0.000000E+00 | 0.000000E+00 | 0.000000E+00 |

In the sixth embodiment, the form of the aspheric surface equation therein is presented as that in the first embodiment. Furthermore, the definition of parameters in the following tables is equivalent to that in the first embodiment, so that the repetitive details are not stated here.

The following values for the conditional expressions may be obtained from the data in Table 11 and Table 12.

| Sixth Embodiment (Primary reference wavelength = 555 nm) | | | | | |
|---|---|---|---|---|---|
| InRS41 | InRS42 | HVT41 | HVT42 | ODT % | TDT % |
| 0.17333 | 0.61378 | 1.22584 | 0.00000 | −71.26940 | 42.76640 |
| \| f/f1 \| | \| f/f2 \| | \| f/f3 \| | \| f/f4 \| | \| f1/f2 \| | \| f2/f3 \| |
| 0.28776 | 0.26764 | 1.02436 | 0.41014 | 0.93009 | 3.82732 |
| ΣPPR | ΣNPR | ΣPPR/\| ΣNPR \| | | ΣNP | f1/ΣPP |
| 1.70214 | 0.28776 | 5.91513 | −7.94997 | −5.31463 | 0.46904 |
| f4/ΣNP | IN12/f | IN23/f | IN34/f | TP3/f | TP4/f |
| 1.00000 | 2.77531 | 0.03269 | 0.03269 | 1.07629 | 0.29913 |
| InTL | HOS | HOS/HOI | InS/HOS | InTL/HOS | ΣTP/InTL |
| 13.14210 | 15.14560 | 6.05824 | 0.30443 | 0.86772 | 0.66943 |
| (TP1 + IN12)/TP2 | (TP4 + IN34)/TP3 | TP1/TP2 | TP3/TP4 | IN23/(TP2 + IN23 + TP3) | |
| 32.38477 | 0.30830 | 19.43086 | 3.59805 | 0.02471 | |
| \| InRS41 \|/TP4 | \| InRS42 \|/TP4 | HVT42/HOI | HVT42/HOS | | |
| 0.3789 | 1.3417 | 0.0000 | 0.0000 | | |
| PLTA | PSTA | NLTA | NSTA | SLTA | SSTA |
| −0.022 mm | 0.008 mm | −0.013 mm | 0.001 mm | 0.005 mm | 0.007 mm |

The following values for the conditional expressions may be obtained from the data in Table 11 and Table 12.

| Values Related to Inflection Point of sixth Embodiment (Primary Reference Wavelength = 555 nm) | | | |
|---|---|---|---|
| HIF211 | 0.5071 | HIF211/HOI | 0.2028 |
| HIF221 | 0.5926 | HIF221/HOI | 0.2371 |
| HIF321 | 1.3115 | HIF321/HOI | 0.5246 |
| HIF411 | 0.7369 | HIF411/HOI | 0.2947 |
| HIF421 | 0.9959 | HIF421/HOI | 0.3983 |
| SGI211 | 0.0430 | \| SGI211 \|/(\| SGI211 \| + TP2) | 0.1160 |
| SGI221 | 0.0954 | \| SGI221 \|/(\| SGI221 \| + TP2) | 0.2255 |
| SGI321 | −0.6713 | \| SGI321 \|/(\| SGI321 \| + TP3) | 0.2897 |
| SGI411 | 0.1194 | \| SGI411 \|/(\| SGI411 \| + TP4) | 0.2070 |
| SGI421 | 0.3437 | \| SGI421 \|/(\| SGI421 \| + TP4) | 0.4290 |

The values pertaining to the length of the outline curves are obtainable from the data in Table 11 and Table 12:

| Sixth Embodiment (Primary reference wavelength = 555 nm) | | | | | | |
|---|---|---|---|---|---|---|
| ARE | 1/2(HEP) | ARE value | ARE − 1/2(HEP) | 2(ARE/HEP)% | TP | ARE/TP(%) |
| 11 | 0.425 | 0.424 | −0.00080 | 99.81% | 6.367 | 6.66% |
| 12 | 0.425 | 0.426 | 0.00145 | 100.34% | 6.367 | 6.70% |
| 21 | 0.425 | 0.426 | 0.00070 | 100.17% | 0.328 | 129.87% |
| 22 | 0.425 | 0.428 | 0.00368 | 100.87% | 0.328 | 130.78% |
| 31 | 0.425 | 0.428 | 0.00275 | 100.65% | 1.646 | 25.98% |
| 32 | 0.425 | 0.433 | 0.00811 | 101.91% | 1.646 | 26.30% |
| 41 | 0.425 | 0.427 | 0.00228 | 100.54% | 0.457 | 93.36% |
| 42 | 0.425 | 0.434 | 0.00946 | 102.23% | 0.457 | 94.93% |
| ARS | EHD | ARS value | ARS − EHD | (ARS/EHD)% | TP | ARS/TP(%) |
| 11 | 11.418 | 11.645 | 0.226 | 101.98% | 6.367 | 182.90% |
| 12 | 2.362 | 3.409 | 1.047 | 144.33% | 6.367 | 53.54% |
| 21 | 0.890 | 0.894 | 0.004 | 100.45% | 0.328 | 272.89% |

-continued

Sixth Embodiment (Primary reference wavelength = 555 nm)

| 22 | 1.135 | 1.152 | 0.017 | 101.52% | 0.328 | 351.56% |
| 31 | 1.301 | 1.339 | 0.038 | 102.89% | 1.646 | 81.34% |
| 32 | 1.450 | 1.700 | 0.249 | 117.19% | 1.646 | 103.26% |
| 41 | 1.432 | 1.457 | 0.025 | 101.73% | 0.457 | 318.49% |
| 42 | 1.554 | 1.682 | 0.128 | 108.25% | 0.457 | 367.68% |

Although the present invention is disclosed via the aforementioned embodiments, those embodiments do not serve to limit the scope of the present invention. A person skilled in the art may perform various alterations and modifications to the present invention without departing from the spirit and the scope of the present invention. Hence, the scope of the present invention should be defined by the following appended claims.

Despite the fact that the present invention is specifically presented and illustrated with reference to the exemplary embodiments thereof, it should be obvious to a person skilled in the art that, various modifications to the forms and details of the present invention may be performed without departing from the scope and spirit of the present invention defined by the following claims and equivalents thereof

What is claimed is:

1. An optical image capturing system, from an object side to an image side, comprising:
    a first lens with refractive power;
    a second lens with refractive power;
    a third lens with refractive power;
    a fourth lens with refractive power; and
    an image plane;
    wherein the optical image capturing system comprises four lenses with refractive power, focal lengths of the four lenses are expressed as f1, f2, f3 and f4 respectively, a focal length of the optical image capturing system is expressed as f, an entrance pupil diameter of the optical image capturing system is expressed as HEP, a distance on an optical axis from an object side of the first lens to the image plane is expressed as HOS, a distance on the optical axis from the object side of the first lens to an image side of the fourth lens is expressed as InTL, a half maximum angle of view of the optical image capturing system is expressed as HAF, with a point on the surface of any one of the four lenses which crosses the optical axis defined as a starting point, a length of an outline curve from the starting point to a coordinate point of vertical height with a distance from the optical axis to the half entrance pupil diameter on the surface along an outline of the surface is expressed as ARE, and conditions as follows are satisfied: 1≤f/HEP≤10, 0 deg<HAF≤150 deg, and 0.9≤2(ARE/HEP)≤2;
    wherein the refraction powers of the first to the fourth lens are ++−− or −−+− in sequence.

2. The optical image capturing system of claim 1, wherein a distance on the optical axis between the first lens and the second lens is expressed as IN12, a distance on the optical axis between the second lens and the third lens is expressed as IN23, a distance on the optical axis between the third lens and the fourth lens is expressed as IN34, and the following conditions are satisfied: IN12>IN23>IN34.

3. The optical image capturing system of claim 1, wherein an effective maximum radius of any surface of any lens among the four lenses is expressed as EHD, and with a point on the surface of any one of the four lenses which crosses the optical axis defined as a first starting point, the maximum effective half diameter position of the surface along the outline of the surface defined as a first final point, a length of outline curve from the first starting point to the first final point is ARS, and the following condition is satisfied: 0.9≤ARS/EHD≤2.0.

4. The optical image capturing system of claim 1, wherein the optical image capturing system meets a following condition: 0 mm<HOS≤50 mm.

5. The optical image capturing system of claim 1, wherein a TV distortion of the optical image capturing system when forming image is expressed as TDT, the optical image capturing system has an maximum image height HOI which is perpendicular to the optical axis on the image plane, a lateral aberration of the longest operation wavelength of visible light of a positive tangential fan of the optical image capturing system passing through a margin of the entrance pupil and incident at the image plane by 0.7 HOT is expressed as PLTA, and a lateral aberration of the shortest operation wavelength of visible light of the positive tangential fan of the optical image capturing system passing through the margin of the entrance pupil and incident at the image plane by 0.7 HOI is expressed as PSTA, a lateral aberration of the longest operation wavelength of visible light of a negative tangential fan of the optical image capturing system passing through the margin of the entrance pupil and incident at the image plane by 0.7 HOI is expressed as NLTA, a lateral aberration of the shortest operation wavelength of visible light of a negative tangential fan of the optical image capturing system passing through the margin of the entrance pupil and incident at the image plane by 0.7 HOT is expressed as NSTA, a lateral aberration of the longest operation wavelength of visible light of a sagittal fan of the optical image capturing system passing through the margin of the entrance pupil and incident at the image plane by 0.7 HOT is expressed as SLTA, a lateral aberration of the shortest operation wavelength of visible light of the sagittal fan of the optical image capturing system passing through the margin of the entrance pupil and incident at the image plane by 0.7 HOT is expressed as SSTA, and the following conditions are satisfied: PLTA≤100 µm; PSTA≤100 µm; NLTA≤100 µm; NSTA≤100 µm; SLTA≤100 µm; and SSTA≤100 µm; |TDT|<100%.

6. The optical image capturing system of claim 1, wherein with a second point on the object side of the fourth lens which crosses the optical axis defined as a second starting point, a length of an outline curve from the second starting point to a second coordinate point of vertical height with a distance from the optical axis to the half entrance pupil diameter the surface along an outline of the surface is expressed as ARE41, with a third point on the image side of the fourth lens which crosses the optical axis defined as a third starting point, a length of an outline curve from the third starting point to a third coordinate point of vertical height with a distance from the optical axis to the half entrance pupil diameter on the surface along an outline of the surface is expressed as ARE42, a thickness of the fourth lens on the optical axis is expressed as TP4, and the following conditions are satisfied: 0.05≤ARE41/TP4≤25; and 0.05≤ARE42/TP4≤25.

7. The optical image capturing system of claim 1, wherein with a fourth point on the object side of the third lens which crosses the optical axis defined as a fourth starting point, a length of an outline curve from the fourth starting point to a fourth coordinate point of vertical height with a distance from the optical axis to the half entrance pupil diameter on the surface along an outline of the surface is expressed as ARE31, with a fifth point on the image side of the third lens which crosses the optical axis defined as a fifth starting point, a length of an outline curve from the fifth starting point to a fifth coordinate point of vertical height with a distance from the optical axis to the half entrance pupil diameter on the surface along an outline of the surface is expressed as ARE32, a thickness of the third lens on the optical axis is expressed as TP3, the following conditions are satisfied: 0.05≤ARE31/TP3≤25 and 0.05≤ARE32/TP3≤25.

8. The optical image capturing system of claim 1, wherein the fourth lens has negative refractive power.

9. The optical image capturing system of claim 1, further comprising an aperture, wherein a distance from the aperture to the image plane on the optical axis is expressed as InS, and a condition as follows is satisfied: 0.2≤InS/HOS≤1.1.

10. An optical image capturing system, from an object side to an image side, comprising:
a first lens with refractive power;
a second lens with positive refractive power;
a third lens with refractive power;
a fourth lens with negative refractive power; and
an image plane;
wherein the optical image capturing system comprises four lenses with refractive power, focal lengths of the four lenses are expressed as f1, f2, f3 and f4 respectively, a focal length of the optical image capturing system is expressed as f, an entrance pupil diameter of the optical image capturing system is expressed as HEP, a distance from an object side of the first lens to the image plane on the optical axis is expressed as HOS, a distance from the object side of the first lens to an image side of the fourth lens on the optical axis is expressed as InTL, a half maximum angle of view of the optical image capturing system is expressed as HAF, with a point on the surface of any one of the four lenses which crosses the optical axis defined as a starting point, a length of an outline curve from the starting point to a coordinate point of vertical height with a distance from the optical axis to the half entrance pupil diameter on the surface along an outline of the surface is expressed as ARE, and conditions as follows are satisfied: 1≤f/HEP≤10, 0 deg<HAF≤150 deg, and 0.9≤2(ARE/HEP≤2;
wherein the refraction powers of the first to the fourth lens are +++− in sequence.

11. The optical image capturing system of claim 10, wherein a thickness of the third lens on the optical axis is expressed as TP3, a thickness of the fourth lens on the optical axis is expressed as TP4 and a condition as follows is satisfied: TP3>TP4.

12. The optical image capturing system of claim 10, wherein an object side of the first lens on the optical axis is a concave surface and an image side of the first lens on the optical axis is a convex surface.

13. The optical image capturing system of claim 10, wherein an effective maximum radius of any surface of any lens among the four lenses is expressed as EHD, and with a point on the surface of any one of the four lenses which crosses the optical axis defined as a first starting point, the maximum effective half diameter position of the surface along the outline of the surface defined as a first final point, a length of outline curve from the first starting point to the first final point is ARS, and the following condition is satisfied: 0.9≤ARS/EHD≤2.0.

14. The optical image capturing system of claim 10, wherein the optical image capturing system has an maximum image height HOT which is perpendicular to the optical axis on the image plane, a lateral aberration of the longest operation wavelength of visible light of a positive tangential fan of the optical image capturing system passing through a margin of the entrance pupil and incident at the image plane by 0.7 HOT is expressed as PLTA, and a lateral aberration of the shortest operation wavelength of visible light of the positive tangential fan of the optical image capturing system passing through the margin of the entrance pupil and incident at the image plane by 0.7 HOT is expressed as PSTA, a lateral aberration of the longest operation wavelength of visible light of a negative tangential fan of the optical image capturing system passing through the margin of the entrance pupil and incident at the image plane by 0.7 HOT is expressed as NLTA, a lateral aberration of the shortest operation wavelength of visible light of a negative tangential fan of the optical image capturing system passing through the margin of the entrance pupil and incident at the image plane by 0.7 HOT is expressed as NSTA, a lateral aberration of the longest operation wavelength of visible light of a sagittal fan of the optical image capturing system passing through the margin of the entrance pupil and incident at the image plane by 0.7 HOT is expressed as SLTA, a lateral aberration of the shortest operation wavelength of visible light of the sagittal fan of the optical image capturing system passing through the margin of the entrance pupil and incident at the image plane by 0.7 HOT is expressed as SSTA, and the following conditions are satisfied: PLTA≤50 μm; PSTA≤50 μm; NLTA≤50 μm; NSTA≤50 μm; SLTA≤50 μm; and SSTA≤50 μm.

15. The optical image capturing system of claim 10, wherein a distance between the first lens and the second lens on the optical axis is expressed as IN12, and a condition as follows is satisfied: 0<IN12/f≤60.

16. The optical image capturing system of claim 10, wherein a distance between the third lens and the fourth lens on the optical axis is expressed as IN34, and a condition as follows is satisfied: 0<IN34/f≤5.

17. The optical image capturing system of claim 10, wherein a distance between the third lens and the fourth lens on the optical axis is expressed as IN34, a thickness of the third lens on the optical axis is expressed as TP3, a thickness of the fourth lens on the optical axis is expressed as TP4 and a condition as follows is satisfied: 1≤(TP4+IN34)/TP3≤10.

18. The optical image capturing system of claim 10, wherein a distance between the first lens and the second lens on the optical axis is expressed as IN12, a thickness of the first lens on the optical axis is expressed as TP1, a thickness of the second lens on the optical axis is expressed as TP2, and a condition as follows is satisfied: 1≤(TP1+IN12)/TP2≤10.

19. The optical image capturing system of claim 10, wherein at least one lens among the first lens, the second lens, the third lens and the fourth lens is a filter element of light with a wavelength less than 500 nm.

20. An optical image capturing system, from an object side to an image side, comprising:
a first lens with refractive power;
a second lens with positive refractive power;
a third lens with positive refractive power;
a fourth lens with negative refractive power; and
an image plane;
wherein the optical image capturing system comprises four lenses with refractive power, at least one surface of at least one lens of the first lens to the fourth lens has at least one inflection point, focal lengths of the first lens to the fourth lens are expressed as f1, f2, f3 and f4 respectively, a focal length of the optical image capturing system is expressed as f, an entrance pupil diameter of the optical image capturing system is expressed as HEP, a distance from an object side of the first lens to the image plane on the optical axis is expressed as HOS, a distance from the object side of the first lens to an image side of the fourth lens on the optical axis is expressed as InTL, a half maximum angle of view of the optical image capturing system is expressed as HAF, with a point on the surface of any one of the four lenses which crosses the optical axis defined as a starting point, the length of an outline curve from the starting point to a coordinate point of vertical height with a distance from the optical axis to the half entrance pupil diameter on the surface along an outline of the surface is expressed as ARE, and conditions as follows are satisfied: 1≤f/HEP≤10, 0 deg<HAF≤150 deg, and 0.9≤2(ARE/HEP)≤2;

wherein the refraction powers of the first to the fourth lens are −++− in sequence.

21. The optical image capturing system of claim 20, wherein a distance on the optical axis between the first lens and the second lens is expressed as IN12, a distance on the optical axis between the second lens and the third lens is expressed as IN23, a distance on the optical axis between the third lens and the fourth lens is expressed as IN34, and the following conditions are satisfied: IN12>IN23>IN34.

22. The optical image capturing system of claim 20, wherein a thickness of the third lens on the optical axis is expressed as TP3, a thickness of the fourth lens on the optical axis is expressed as TP4, and a condition as follows is satisfied: TP3>TP4.

23. The optical image capturing system of claim 20, wherein an image side of the third lens on the optical axis is a convex surface.

24. The optical image capturing system of claim 20, wherein the optical image capturing system satisfies a condition as follows: 0 mm<HOS≤50 mm.

25. The optical image capturing system of claim 20, further comprising an aperture, an image sensing device and a driving module, wherein the image sensing device is disposed at the image plane and a distance from the aperture to the image plane is expressed as InS, the driving module is coupled to the lenses and enables movements of the lenses and a condition as follows is satisfied: 0.2≤InS/HOS≤1.1.

* * * * *